United States Patent
Kitamura et al.

(10) Patent No.: US 8,798,344 B2
(45) Date of Patent: Aug. 5, 2014

(54) IMAGE PROCESSING APPARATUS, IMAGE PROCESSING METHOD AND COMPUTER-READABLE RECORDING DEVICE

(75) Inventors: Makoto Kitamura, Hachioji (JP); Yamato Kanda, Hino (JP); Takashi Kono, Tachikawa (JP); Masashi Hirota, Hachioji (JP)

(73) Assignee: Olympus Corporation, Tokyo (JP)

( * ) Notice: Subject to any disclaimer, the term of this patent is extended or adjusted under 35 U.S.C. 154(b) by 71 days.

(21) Appl. No.: 13/323,910

(22) Filed: Dec. 13, 2011

(65) Prior Publication Data
US 2012/0155724 A1   Jun. 21, 2012

(30) Foreign Application Priority Data
Dec. 16, 2010  (JP) ................................. 2010-280716

(51) Int. Cl.
*G06K 9/00*  (2006.01)
(52) U.S. Cl.
CPC ....................... *G06K 9/00* (2013.01)
USPC ........... 382/128; 382/141; 382/190; 382/257; 382/266

(58) Field of Classification Search
CPC .................. G06T 7/0012; G06T 2207/30024; G06T 2207/30004; G06T 7/0083; G06T 7/60; G06T 7/0081; G06T 7/0085; G06T 2207/20141; G06T 7/0079; G06T 7/0002; G02B 21/008; A61B 8/469; A61B 5/0033; A61B 2019/5289; G06K 9/0061; G06K 9/4671; G06K 9/4676; G06K 9/3233
USPC .......................... 382/128, 141, 190, 257, 266
See application file for complete search history.

(56) References Cited

U.S. PATENT DOCUMENTS

| | | | | |
|---|---|---|---|---|
| 4,941,182 | A * | 7/1990 | Patel | 382/141 |
| 5,566,249 | A | 10/1996 | Rosenlof et al. | |
| 6,415,054 | B1 * | 7/2002 | Silverbrook et al. | 382/233 |
| 6,529,630 | B1 * | 3/2003 | Kinjo | 382/190 |
| 7,231,072 | B2 * | 6/2007 | Yamano et al. | 382/128 |
| 7,239,740 | B1 * | 7/2007 | Fujieda | 382/150 |
| 7,298,878 | B2 * | 11/2007 | Goto | 382/128 |
| 7,826,659 | B2 * | 11/2010 | Umeda | 382/167 |
| 7,853,057 | B2 * | 12/2010 | Matsumoto | 382/128 |
| 7,887,174 | B2 * | 2/2011 | Katada | 347/92 |

(Continued)

FOREIGN PATENT DOCUMENTS

| | | |
|---|---|---|
| JP | 2007-313119 | 12/2007 |
| JP | 2009-136655 A | 6/2009 |
| JP | 2010-115260 A | 5/2010 |

OTHER PUBLICATIONS

European Partial Search Report dated Apr. 12, 2012 from corresponding European Patent Application No. EP 11 00 9867.0.

(Continued)

*Primary Examiner* — Vu Le
*Assistant Examiner* — Aklilu Woldemariam
(74) *Attorney, Agent, or Firm* — Scully, Scott, Murphy & Presser, P.C.

(57) ABSTRACT

An image processing apparatus includes: a candidate point extraction unit which extracts, from an image, candidate points which are candidates for points constituting a circular region that represents a bubble; and a circular-region detecting unit which detects a circular region in the image on the basis of information belonging to the candidate points.

27 Claims, 17 Drawing Sheets

(56) References Cited

U.S. PATENT DOCUMENTS

| | | | |
|---|---|---|---|
| 8,073,233 B2* | 12/2011 | Kanda | 382/133 |
| 2003/0161520 A1* | 8/2003 | Yamano et al. | 382/128 |
| 2004/0001195 A1* | 1/2004 | Ge | 356/73.1 |
| 2006/0280363 A1* | 12/2006 | Umeda | 382/167 |
| 2008/0056610 A1* | 3/2008 | Kanda | 382/282 |
| 2009/0148014 A1 | 6/2009 | Kanda | |
| 2009/0316988 A1* | 12/2009 | Xu et al. | 382/173 |

OTHER PUBLICATIONS

Honkanen, M., et al., "Digital Imaging Measurement of Dense Multiphase Flows in Industrial Processes", Flow Measurement and Instrumentation, vol. 21(1), Mar. 1, 2010, pp. 25-32.

Yigang, W., et al., "A Low Complexity and High Performance Real-Time Algorithm of Detecting and Tracking Circular Shape in Hole-Punching Machine", Proceedings of 2008 $3^{rd}$ International Conference on Intelligent System and Knowledge Engineering, Nov. 17, 2008, pp. 604-608.

Wu, J., "Robust Real-Time Ellipse Detection by Direct Least-Square-Fitting", 2008 International Conference on Computer Science and Software Engineering, Dec. 12, 2008, pp. 923-927.

Jun, Z., et al., "Method for Detecting Elliptical Pattern Using Director Circle/ Communications on the Move", Singapore ICCS/ISITA '92, Nov. 16-20, 1992, pp. 539-543.

Qiao, Y., et al., "Connectivity-Based Multiple-Circle Fitting", Pattern Recognition, vol. 37(4), Apr. 1, 2004, pp. 755-765.

European Extended Search Report dated Jan. 9, 2013 from corresponding European Patent Application No. EP 11 00 9867.0.

Stokes, M.D., et al., "A New Optical Instrument for the Study of Bubbles at High Void Fractions Within Breaking Waves", IEEE Journal of Oceanic Engineering, vol. 24 (3), Jul. 1, 1999, pp. 300-311.

Tsai, J.T., "An Underwater Bubble Detection and Analysis System Utilizing the Hough Transform", The Virginia Academy of Science, Virginia Journal of Science, Mar. 27, 2001, pp. i-v and 1-25 (the whole document).

Russ, J.C., "The Image Processing Handbook", $5^{th}$ Edition, Dec. 19, 2006, pp. 560-565.

Japanese Official Action dated Apr. 8, 2014 received in related application JP 2010-280716.

\* cited by examiner

128

| R VALUE | | ... | 64 | ... | 128 | ... | 255 |
|---|---|---|---|---|---|---|---|
| SIZE OF CIRCULAR REGION | MINIMUM RADIUS (mm) | ... | 8 | ... | 12 | ... | 24 |
| | MAXIMUM RADIUS (mm) | ... | 12 | ... | 24 | ... | – |

IMAGE PROCESSING APPARATUS, IMAGE PROCESSING METHOD AND COMPUTER-READABLE RECORDING DEVICE

CROSS-REFERENCE TO RELATED APPLICATIONS

This application is based upon and claims the benefit of priority from Japanese Patent Application No. 2010-280716, filed on Dec. 16, 2010, the entire contents of which are incorporated herein by reference.

BACKGROUND OF THE INVENTION

1. Field of the Invention

The present invention relates to an image processing apparatus, an image processing method and a computer-readable recording device to detect, from an image, a region onto which a bubble has been imaged.

2. Description of the Related Art

Conventionally, endoscopes are widely used as medical observation devices, which are introduced into the bodies of examinees such as patients and through which the insides of living organisms are non-invasively observed. In recent years, even an endoscope (capsule endoscope) to be swallowed has been developed, which has a capsule-shaped casing to accommodate an imaging device, a communication device and the like, and wirelessly transmits image data captured by the imaging device to the outside of the body. The number of images (in-vivo images) obtained in series by imaging the interior of a lumen by use of such a medical observation device is enormous (not less than tens of thousands), and observing and diagnosing each in-vivo image requires abundant experience. Therefore, a medical diagnosis support capability to assist a doctor in diagnosis is desirable.

As one image recognition technology that implements such a capability, a technology for automatically detecting and removing from images any regions not requiring to be observed in a medical diagnosis has been proposed. Here, the regions not requiring to be observed are regions other than a mucous membrane, which is a biological tissue, and include, for example, a region (hereinafter, referred to as "bubble region") onto which an air bubble (hereinafter, referred to simply as "bubble") generated in the interior of a lumen has been imaged. For example, Japanese Patent Application Laid-open No. 2007-313119 discloses a method for calculating correlation values between gradient magnitudes of pixels and bubble models having been preset on the basis of features of bubble images, and detecting as a bubble region a region that gives the correlation value of a predetermined threshold or more.

SUMMARY OF THE INVENTION

An image processing apparatus according to an aspect of the present invention includes: a candidate point extraction unit which extracts, from an image, candidate points which are candidates for points constituting a circular region that represents a bubble; and a circular-region detecting unit which detects a circular region in the image on the basis of information belonging to the candidate points.

An image processing method according to another aspect of the present invention includes: candidate point extracting in which a candidate point extraction unit extracts, from an image, candidate points which are candidates for points constituting a circular region that represents a bubble; and circular-region detecting in which a circular-region detecting unit detects a circular region in the image on the basis of information belonging to the candidate points.

A computer-readable recording device according to still another aspect of the present invention with an executable program stored thereon, wherein the program instructs a processor to perform: candidate point extracting in which a candidate point extraction unit extracts, from an image, candidate points which are candidates for points constituting a circular region that represents a bubble; and circular-region detecting in which a circular-region detecting unit detects a circular region in the image on the basis of information belonging to the candidate points.

The above and other features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
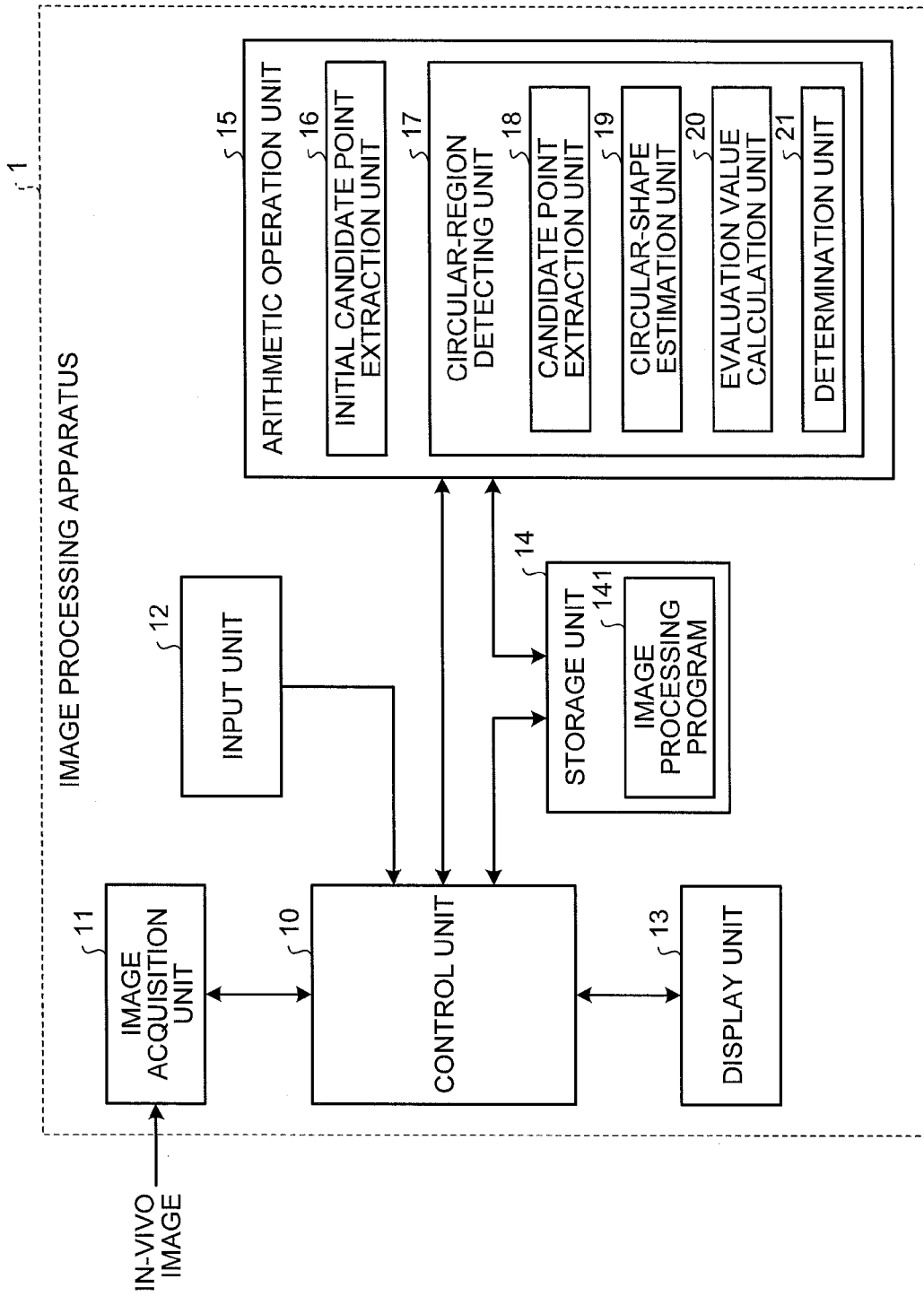
FIG. 1 is a block diagram showing the configuration of an image processing apparatus according to a first embodiment of the present invention.

Image processing apparatuses according to embodiments of the present invention are described below with reference to the drawings. Note that the present invention is not limited by these embodiments. Additionally, the same parts are shown with the same reference numerals attached thereto in describing the drawings.

The image processing apparatus according to each of the embodiments described below is configured to process images captured by a medical observation device such as an endoscope or a capsule endoscope. Specifically, the image processing apparatus detects, from an image obtained by imaging the inside of a living organism (lumen) of an examinee, a bubble region onto which a bubble has been imaged. In the following description, an in-vivo image to which the image processing is applied is, for example, a color image having pixel levels (pixel values) corresponding to 256 gradations with respect to each of color components R (red), G (green) and B (blue) in each pixel. Note that application of the image processing apparatus according to the present invention is not limited to in-vivo images, and is also possible in a case where bubble regions are detected from images in general.

Additionally, each bubble region to be detected in the following embodiments usually has, by the action of surface tension, an appearance in a plan view which has any one of shapes similar to a circle such as a circular, oblate and oval shapes, or any one of shapes (arcs and the like) formed of parts of the circumferences of such shapes. Therefore, in the present application, shapes similar to a circle, such as a perfectly circular shape and oblate and oval shapes, are referred to as "circular shapes", and shapes formed of parts (for example, an arc) of circular shapes are referred to as "arc-like shapes".

First Embodiment

FIG. 1 is a block diagram showing the configuration of an image processing apparatus according to a first embodiment of the present invention. As shown in FIG. 1, an image processing apparatus 1 comprises: a control unit 10 to control operation of the entirety of the image processing apparatus 1; an image acquisition unit 11; an input unit 12; a display unit 13; a storage unit 14; and an arithmetic operation unit 15.

The image acquisition unit 11 acquires image data of an in-vivo image captured by a medical observation device. The image acquisition unit 11 is appropriately configured in accordance with the mode of a system which comprises the medical observation device. For example, in a case where the medical observation device is a capsule endoscope, and a portable recording medium is used for transfer of image data from and to the medical observation device, the image acquisition unit 11 is composed of a reader apparatus on which this recording medium is attachably and detachably mounted, and which reads out image data of stored in-vivo images. Additionally, in a case where a server in which to store image data of in-vivo images captured by the medical observation device is installed, the image acquisition unit 11 is composed of a communication device or the like connected to the server, and performs data communication with the server to acquire the image data of in-vivo images. Alternatively, the image acquisition unit 11 may be composed of an interface device or the like through which image signals are inputted from the medical observation device, such as an endoscope, via a cable.

The input unit 12 is, for example, implemented by a keyboard and mouse, a touch panel or various switches, and outputs input signals to the control unit 10.

The display unit 13 is implemented by a display device such as an LCD or an EL display, and displays various screens containing in-vivo images under the control of the control unit 10.

The storage unit 14 is implemented by an information recording medium and a reader for the medium, example of the information recording medium including: various IC memories including ROM, such as rewritable flash memory, and RAM; a hard disk that is built-in or connected via a data communication terminal; and a CD-ROM. The storage unit 14 stores therein, as well as image data of in-vivo images acquired by the image acquisition unit 11, a program used for causing the image processing apparatus 1 to operate and for causing the image processing apparatus 1 to execute various functions, data to be used during execution of this program, and the like. Specifically, the storage unit 14 stores therein an image processing program 141 used for detecting a bubble region in an in-vivo image.

The arithmetic operation unit 15 is implemented by hardware such as a CPU, and reads the image processing program 141, thereby performing various arithmetic operations for processing image data of in-vivo images and detecting bubble regions from the in-vivo images. The arithmetic operation unit 15 comprises: an initial candidate point extraction unit 16 which extracts, on the basis of characteristics belonging to bubble regions, initial candidate points which are candidates for points constituting a circular region that represents a bubble; and a circular-region detecting unit 17 which detects a circular region on the basis of information belonging to the extracted initial candidate points.

The control unit 10 is implemented by hardware such as a CPU, and performs overall control over the operation of the entirety of the image processing apparatus 1 in such a manner as to read various programs stored in the storage unit 14, and thereby provide instructions to and transfer data to each unit composing the image processing apparatus 1 in accordance with image data inputted from the image acquisition unit 11, actuating signals inputted from the input unit 12, and the like.

Next, the detailed configuration of the arithmetic operation unit 15 is described.

Figure 2:
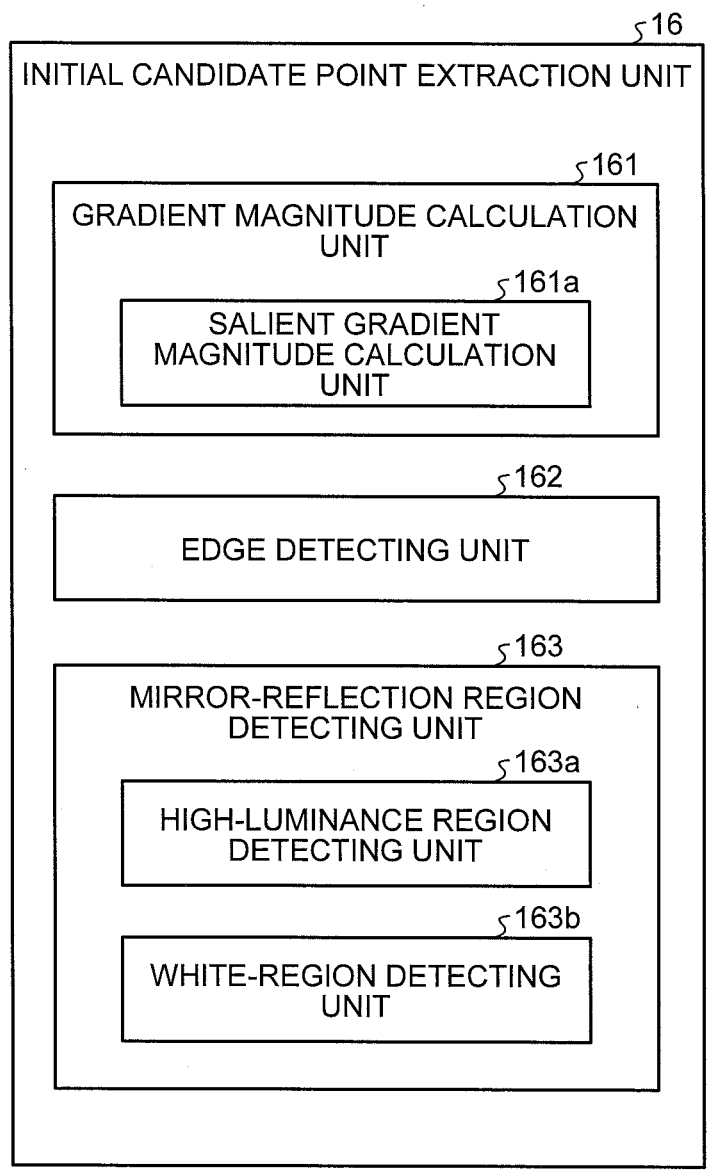
FIG. 2 is a block diagram showing the configuration of an initial candidate point extraction unit shown in FIG. 1.

FIG. 2 is a block diagram showing the configuration of the initial candidate point extraction unit 16. The initial candidate point extraction unit 16 comprises: a gradient magnitude calculation unit 161 which calculates a gradient magnitude of a pixel value in each pixel contained in an in-vivo image; an edge detecting unit 162 which detects an edge on the basis of the gradient magnitudes; and a mirror-reflection region detecting unit 163 which detects a mirror reflection region from an in-vivo image.

As a method executed by the gradient magnitude calculation unit 161 for calculating a gradient magnitude, any one of a variety of known methods including a first derivative such as a Sobel filter, and a second derivative can be used. As one example, the gradient magnitude calculation unit 161 comprises a salient gradient magnitude calculation unit 161a, thereby performing a second derivative to calculate a gradient magnitude in a direction along which the gradient of a pixel value is salient.

The edge detecting unit 162 detects an edge by extracting pixels that have the gradient magnitudes not less than a predetermined threshold. Note that any one of a variety of known methods can be used as a method for detecting an edge. For example, an edge detecting algorithm of Canny (CG-Arts Society, "Digital Image Processing", pp. 208-210) or the like may be used.

The mirror-reflection region detecting unit 163 comprises: a high-luminance region detecting unit 163a which calculates luminance values of pixels contained in an in-vivo image, and detects a high luminance region having a luminance level not less than a predetermined value; and a white-region detecting unit 163b which detects, on the basis of the pixel values of the respective pixels, a region (white region) of pixels having pixel values included in a color range representing the white color. As the color range representing the white color, for example, a range of values (for example, S≤0.2, I≥0.8) obtained by converting RGB values, in a part corresponding to a halation generated in vivo, into HSI values (H: hue, S: saturation, I: lightness) is used (reference: CG-ARTS Society, "Digital Image Processing", pp. 64-68). Such a color range has been previously stored as teacher data in the storage unit 14, and the white-region detecting unit 163b reads out from the storage unit 14, and refers to, the teacher data as necessary.

Figure 3:
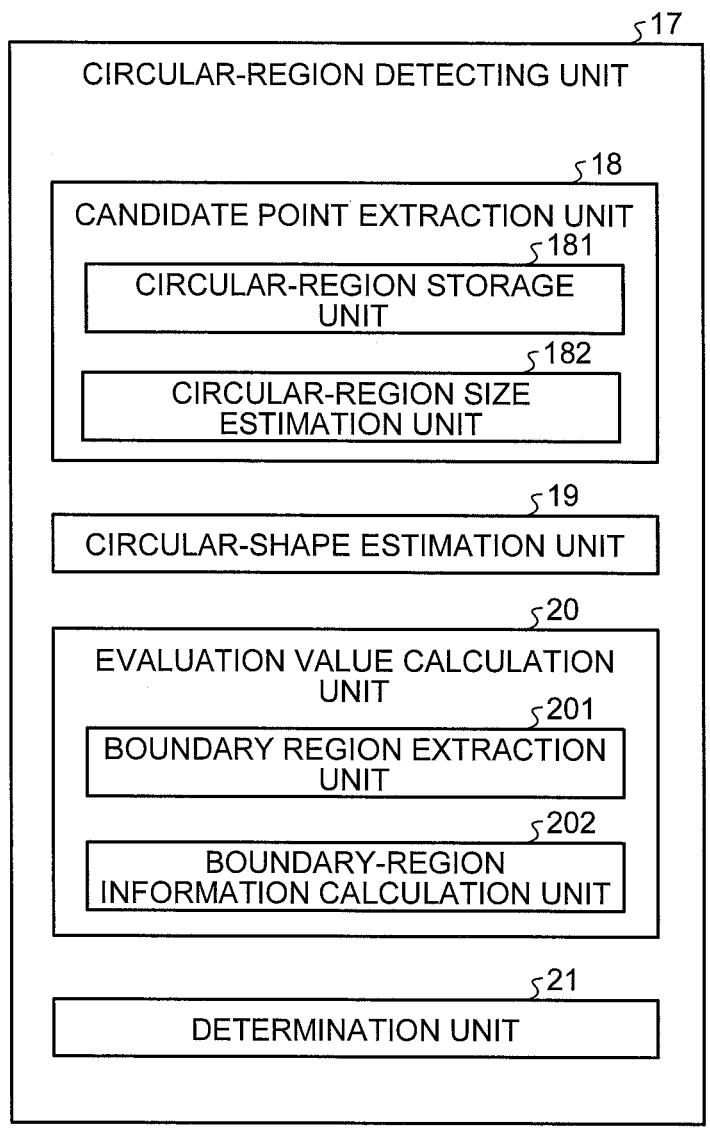
FIG. 3 is a block diagram showing the configuration of a circular-region detecting unit shown in FIG. 1.

FIG. 3 is a block diagram showing the configuration of the circular-region detecting unit 17. The circular-region detecting unit 17 comprises: an estimation-use candidate point extraction unit 18 which extracts, from among the initial candidate points, plural candidate points (estimation-use candidate points) used for estimating a circular region; a circular-shape estimation unit 19 which performs robust estimation, thereby estimating a circular region; an evaluation value calculation unit 20 which calculates an evaluation value used for evaluating whether the estimated circular region exists in the in-vivo image; and a determination unit 21 which compares this evaluation value with a predetermined threshold, thereby evaluating whether the estimated circular region exists in the in-vivo image.

The estimation-use candidate point extraction unit 18 includes a circular-region storage unit 181 which stores therein information on circular regions that have been already detected; and a circular-region size estimation unit 182 which estimates the size of a circular region. The circular-region size estimation unit 182 calculates distance information that represents the depths of objects captured in the in-vivo image, and estimates the size of a circular region on the basis of this distance information.

The evaluation value calculation unit 20 includes: a boundary region extraction unit 201 which extracts a boundary region of a circular region; and a boundary-region information calculation unit 202 which acquires information (hereinafter, also referred to as boundary-region information) on pixels contained in the boundary region. As the boundary-region information, for example, the mean value of the gradient magnitudes of pixel values in the boundary region is used.

Figure 4:
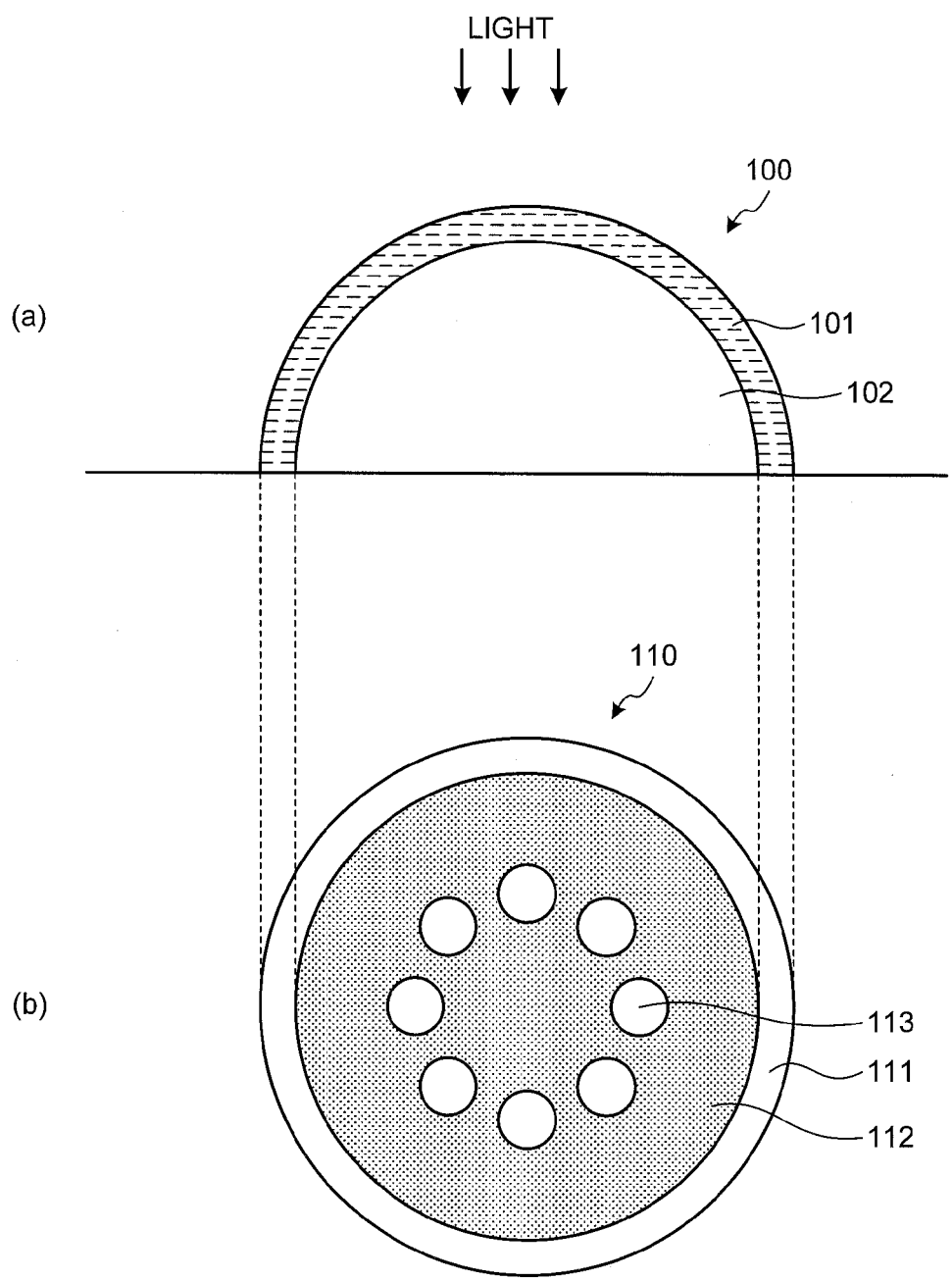
FIG. 4 is a view illustrating the structure of a bubble region.

Here, a bubble region to be detected in the image processing performed by the arithmetic operation unit 15 is described. FIG. 4 is a view illustrating an example of the structure of a bubble region. As shown in part (a) of FIG. 4, a bubble 100 is an object formed of liquid (such as water) containing gas such as air and having been rounded by the surface tension acting thereon, and is composed of a film 101 such as water, and gas 102 that exists inside the film 101. When the bubble 100 as described above is imaged while being irradiated with light, an image of a bubble region 110 as shown in part (b) of FIG. 4 is obtained. This bubble region 110 has a circular or arc-like external shape, and, as an internal structure, includes: a boundary region 111 corresponding to a thickness portion of the film 101 and included in the periphery of the bubble region 110; an interior region 112 located to the inner side thereof; and mirror reflection regions 113 found in plural locations in the inside of the interior region 112. In this structure, the boundary region 111 is a bright region generated as a result of scattering of the irradiation light in the film 101. On the other hand, the interior region 112 is a region generated as a result of transmission of the most of the illuminating light through the film 101, and is a dark region as a whole. Each of the mirror reflection regions 113 is a region, having a high luminance value, where a halation has occurred by the glare of a light source due to mirror reflection of the irradiation light on the surface of the film 101.

Figure 5:
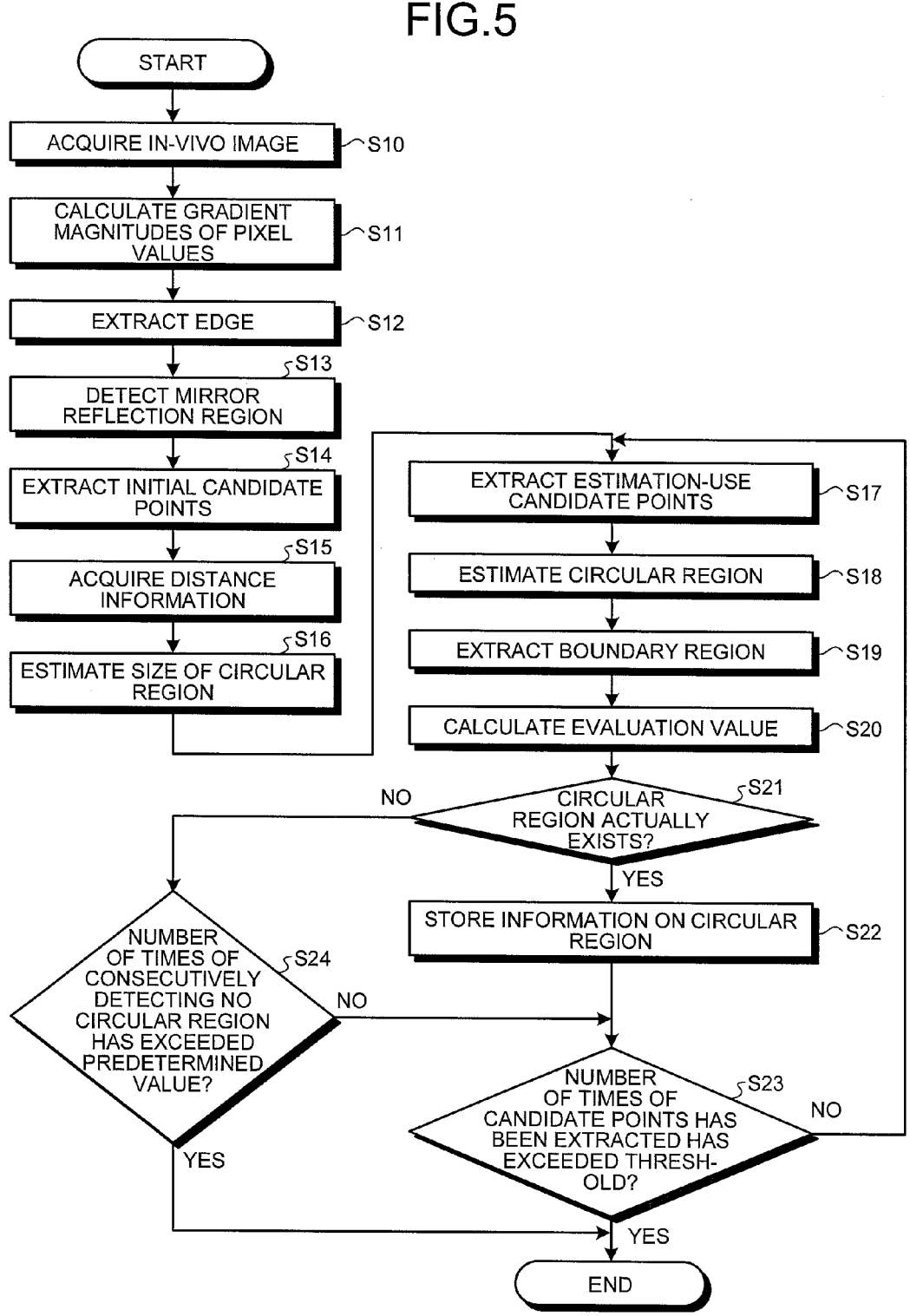
FIG. 5 is a flowchart showing operation of the image processing apparatus shown in FIG. 1.

Next, operation of the image processing apparatus 1 is described. FIG. 5 is a flowchart showing the operation of the image processing apparatus shown in FIG. 1.

Figure 6:
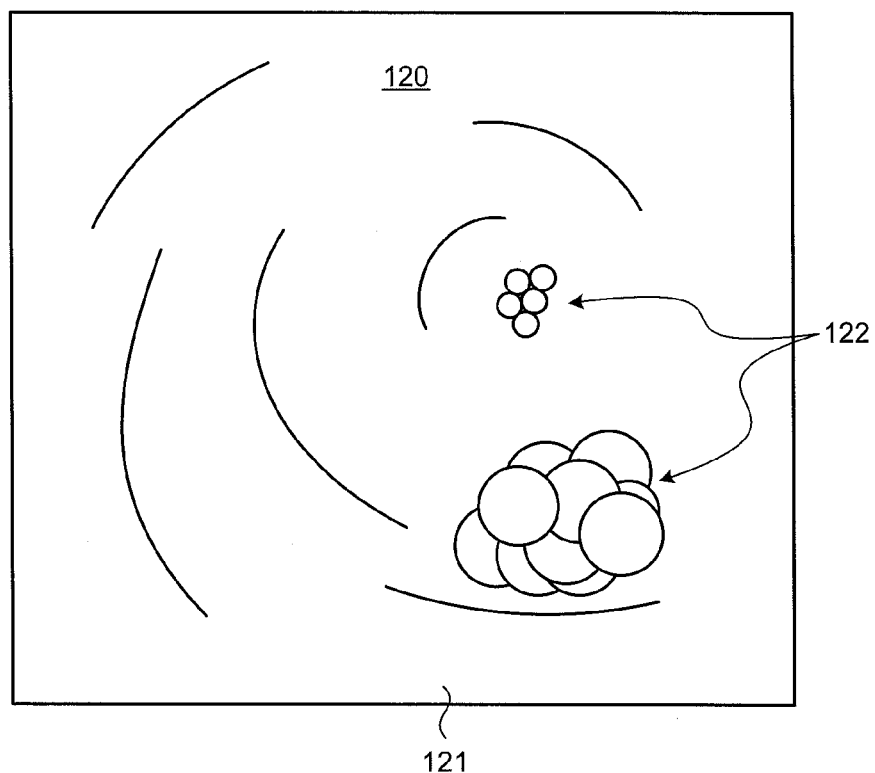
FIG. 6 is a schematic view illustrating one example of an in-vivo image to be processed by the image processing apparatus shown in FIG. 1.

First, in step S10, the image acquisition unit 11 accepts input of a group of in-vivo images from the outside, and stores the in-vivo images in the storage unit 14. The arithmetic operation unit 15 sequentially reads from the storage unit 14 an in-vivo image 120 to which image processing is to be applied. FIG. 6 is a schematic view illustrating one example of the in-vivo image read out from the storage unit 14. As shown in FIG. 6, in some cases, regions 122 having features different from those of a mucosa of a living organism are captured in the in-vivo image 120 in a manner overlapping a mucosal region 121.

Figure 7:
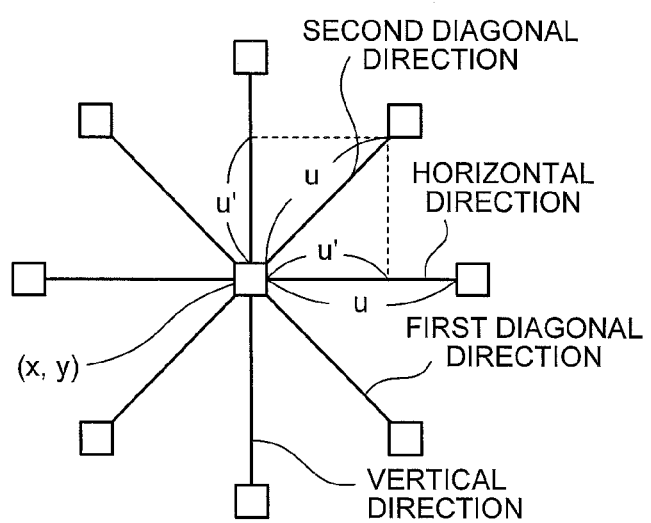
FIG. 7 is a view illustrating a method for calculating a gradient magnitude in a direction along which the gradient of the pixel value is salient.

In step S11, the gradient magnitude calculation unit 161 calculates gradient magnitudes of pixel values in pixels within the in-vivo image 120. Specifically, first, the salient gradient magnitude calculation unit 161a applies formulae (1) to (4) shown below to the pixel value P(x,y) of a pixel located at coordinates (x,y), thereby calculating a second derivative dH in the horizontal direction, a second derivative dV in the vertical direction, a second derivative dD1 in a first diagonal direction, and a second derivative dD2 in a second diagonal direction, as shown in FIG. 7.

$$dH(x,y)=P(x,y)-\tfrac{1}{2}\times(P(x-u,y)+P(x+u,y)) \quad (1)$$

$$dV(x,y)=P(x,y)-\tfrac{1}{2}\times(P(x,y-u)+P(x,y+u)) \quad (2)$$

$$dD1(x,y)=P(x,y)-\tfrac{1}{2}\times(P(x-u',y+u')+P(x+u',y-u')) \quad (3)$$

$$dD2(x,y)=P(x,y)-\tfrac{1}{2}\times(P(x-u',y-u')+P(x+u',y+u')) \quad (4)$$

Here, the parameter u is an integer, and the parameter u' is an integer obtained by rounding off (u/√2). These parameters u and u' indicate the range of pixels at the time of calculating the second derivatives. That is, accuracy of gradient components can be adjusted by setting the parameter u to a desired value. For example, a gradient component that has a high spatial frequency can be calculated when the value of the parameter u is set small, whereas a gradient component that has a low spatial frequency can be calculated when the value of the parameter u is set large. As the value for the parameter u, a fixed value may be set previously, or a dynamic value may be set in accordance with the characteristic of in-vivo images. Alternatively, the processing may be performed by providing from the outside the parameter u set to a desired value.

Subsequently, the salient gradient magnitude calculation unit 161a uses formula (5) shown below to extract the maximum of positive values out of the second derivatives dH, dV, dD1 and dD2 calculated with respect to the different directions, thereby calculating a gradient magnitude (salient gradient magnitude), $g_{conv}(x,y)$, in a direction along which the gradient rises (i.e., the gradient is salient against the neighboring pixels).

$$g_{conv}(x,y) = \max(0, dH(x,y), dV(x,y), dD1(x,y), dD2(x,y)) \quad (5)$$

Here, in the case of the bubble region 110 shown in FIG. 2, the peak of the pixel values inside the boundary region 111 appears along the diametrical direction since the pixel values in the boundary region 111 are larger than the pixel values in the interior region 112 and outside the bubble region 110. Consequently, a rise in pixel values along the diametrical direction can be detected by calculating the salient gradient magnitude $g_{conv}$.

Figure 8:
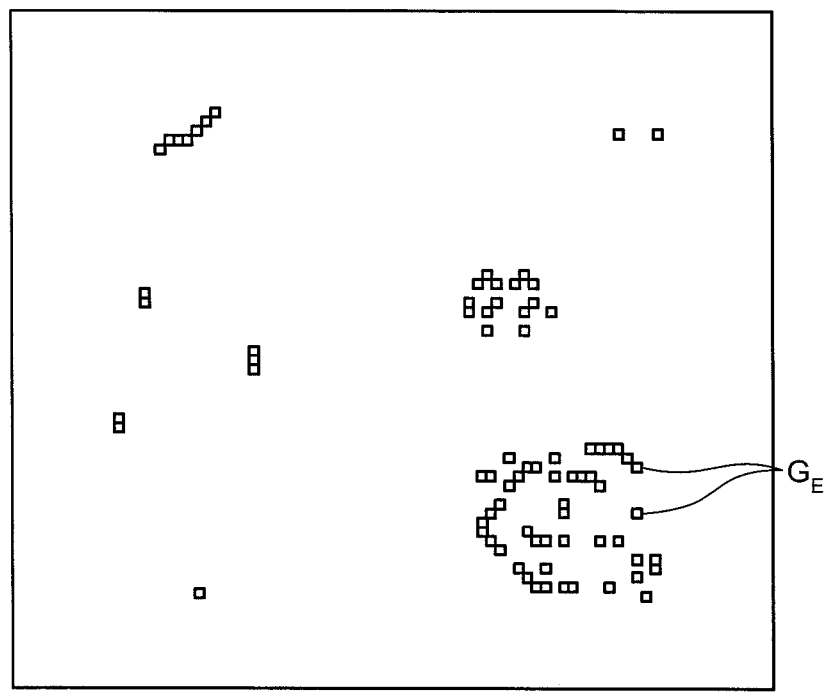
FIG. 8 is a schematic view showing edge pixels extracted from the in-vivo image shown in FIG. 6.

In step S12, using a predetermined threshold, the edge detecting unit 162 binarizes the salient gradient magnitudes $g_{conv}$ calculated for the respective pixels, thereby extracting edge pixels. This step results in extraction of an edge having a high possibility of being the boundary of a bubble region. In an image 125 shown in FIG. 8, edge pixels $G_E$ thus extracted from the in-vivo image 120 are shown.

In step S13, the mirror-reflection region detecting unit 163 detects mirror reflection regions 113 from the in-vivo image 120. Specifically, first, the high-luminance region detecting unit 163a calculates a luminance value Y from the R value (R), G value (G) and B value (B) of each of the pixels within the in-vivo image 120 and by using formula (6) shown below (reference: CG-ARTS Society, "Digital Image Processing", p. 299).

$$Y = 0.3 \times R + 0.59 \times G + 0.11 \times B \quad (6)$$

Subsequently, the high-luminance region detecting unit 163a extracts, as a high-luminance region, any pixel having the luminance value Y not less than a threshold. Further, the white-region detecting unit 163b acquires the R values (R), G values (G) and B values (B) of the pixels extracted as the high-luminance regions, and determines, with reference to the teacher data, whether color components of these pixels are included in the color range that represents the white color. Then, the white-region detecting unit 163b extracts, as a mirror-reflection region, any pixel having the color components included in the color range.

Figure 9:
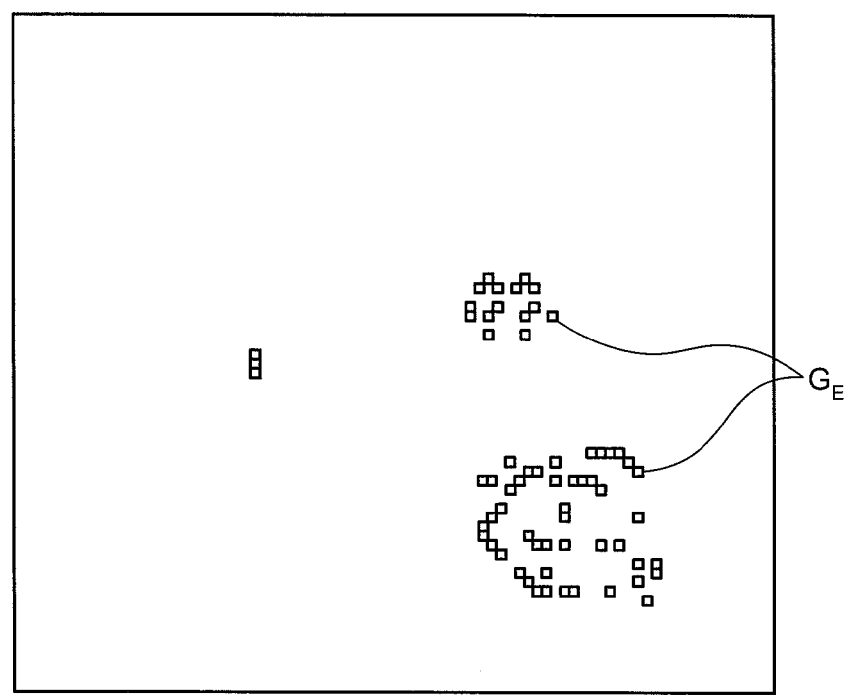
FIG. 9 is a schematic view showing edge pixels extracted from an image shown in FIG. 8 as initial candidate points.

In step S14, the initial candidate point extraction unit 16 extracts, as the initial candidate points, the coordinates of those out of the edge pixels extracted in step S12 that exist in the neighborhood of the mirror reflection regions extracted in step S13, that is, a predetermined range from the mirror reflection regions. This is because an edge in the neighborhood of the mirror reflection regions has a high possibility of being the boundary region 111 of the bubble region 110 (refer to FIG. 4). In an image 126 shown in FIG. 9, edge pixels $G_E$ extracted as the initial candidate points are shown.

Figures 10, 11:
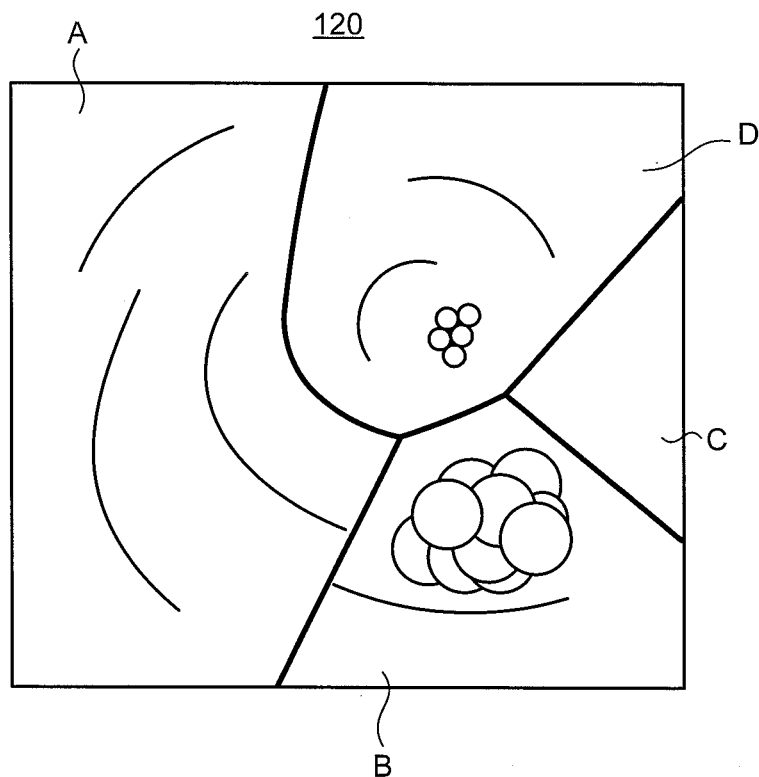
FIG. 10 is a view showing divisional regions obtained by dividing the in-vivo image shown in FIG. 6 on the basis of a distance value (R value)
FIG. 11 is a table showing correspondences between the distance values (R values) and the sizes of a circular region.

In step S15, the circular-region size estimation unit 182 calculates the distance information in the in-vivo image 120. Specifically, the circular-region size estimation unit 182 acquires an R value as a distance value that represents a depth of each pixel, the R value being the least susceptible to absorption and scattering inside a living organism. This is because the shorter a distance between an object and an imaging element (i.e., the closer to the front side an object is in a captured image) is, the larger the R value is. Subsequently, the circular-region size estimation unit 182 divides the in-vivo image 120 into plural regions A to D on the basis of the distance values of the respective values (FIG. 10). As a method for dividing the region, any one of known methods including a region unification method (reference: CG-ARTS Society, "Digital Image Processing", p. 196) and a K-means method being one of the clustering techniques (reference: CG-ARTS Society, "Digital Image Processing", p. 232) may be used, the region unification method being a method by which a region is divided into sets each consisting of pixels that have similar feature data (pixel values, texture feature data or the like) and are spatially close to one another. Further, the circular-region size estimation unit 182 calculates the mean values of the distance values for the respective divisional regions A to D as the distance information.

In subsequent step S16, the circular-region size estimation unit 182 estimates the size of a circular region at the coordinates of the initial candidate points. Here, an in-vivo image usually contains objects located from the near view to distant view. Additionally, in general, an object in the distant view is captured in a smaller size than an object in the near view. Consequently, it is possible to fairly estimate the size of a circular region on the basis of the distance information from within the image.

Specifically, the circular-region size estimation unit 182 acquires, with reference to a table 128 shown in FIG. 11, the range (the minimum radius $r_{MIN}$ and the maximum radius $r_{MAX}$) of the size of a circular region that corresponds to the mean distance value with respect to the divisional regions A to D. Note that the table 128 has been prepared previously and stored in the storage unit 14.

Figure 12:
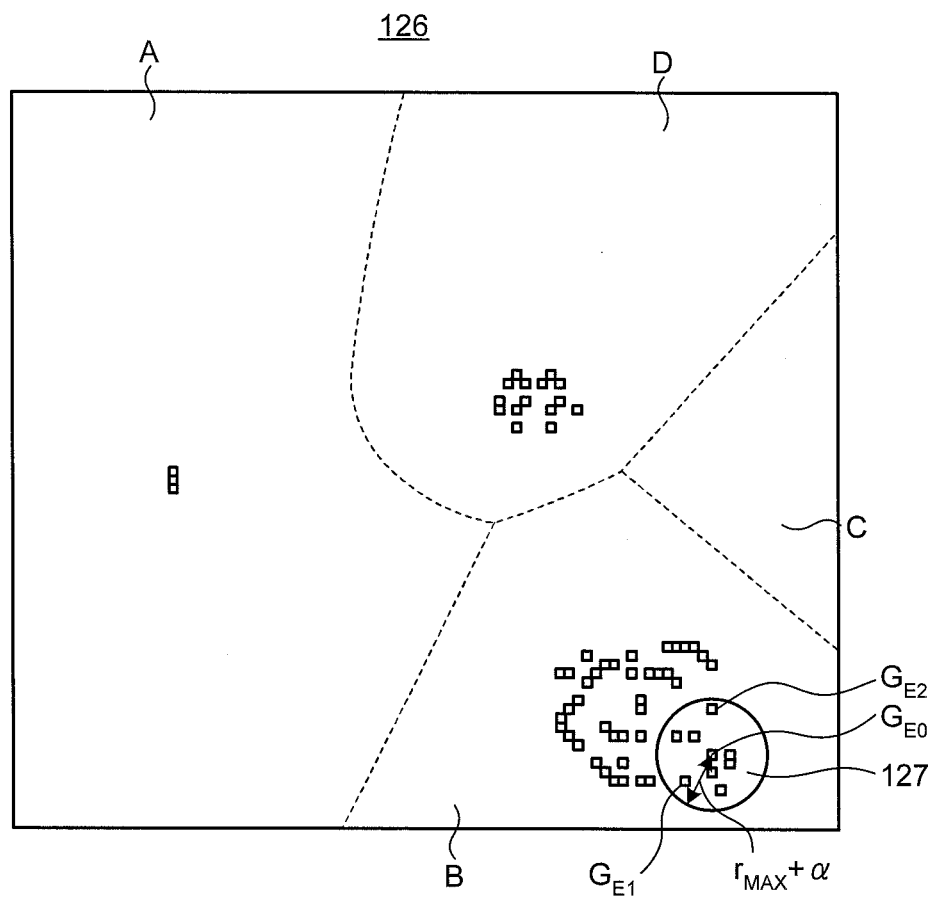
FIG. 12 is a view illustrating a method for estimating a circular region based on RANSAC.

In step S17, the estimation-use candidate point extraction unit 18 extracts plural estimation-use candidate points from among the initial candidate points. Note that, in the first embodiment, the estimation-use candidate points are randomly extracted because a technique called RANSAC (random sampling consensus) is employed. Specifically, first, the estimation-use candidate point extraction unit 18 randomly extracts one point (a candidate point $G_{E0}$) from among the initial candidate points as shown in FIG. 12. Subsequently, the estimation-use candidate point extraction unit 18 finds a region 127 contained in a circle with the origin at the candidate point $G_{E0}$ and with a radius equivalent to any one of: the maximum radius $r_{MAX}$ of the circular region in one of the divisional regions A to D that the candidate point $G_{E0}$ belong to; and a length $(r_{MAX} + \alpha)$ which is slightly larger than the maximum radius $r_{MAX}$. Further, the estimation-use candidate point extraction unit 18 randomly extracts the predetermined number of candidate points $G_{E1}$, $G_{E2}$ and so on as the estimation-use candidate points from within this region 127.

In step S18, the circular-shape estimation unit 19 estimates a circular region on the basis of the estimation-use candidate points $G_{E1}$, $G_{E2}$ and so on. Specifically, after forming simultaneous equations applicable to a circle that passes through the coordinates of the estimation-use candidate points $G_{E1}$, $G_{E2}$ and so on, the circular-shape estimation unit 19 solves these simultaneous equations by use of the least square method, thereby calculating an estimated circular region. Then, the circular-shape estimation unit 19 determines the estimation-use candidate points that have distances from the calculated circular region not more than a predetermined threshold to be inliers, and determines the other estimation-use candidate points to be outliers. Further, the circular-shape estimation unit 19 calculates another circular region by using the coordinates of the estimation-use candidate points that have been determined to be the inliers.

Figure 13:
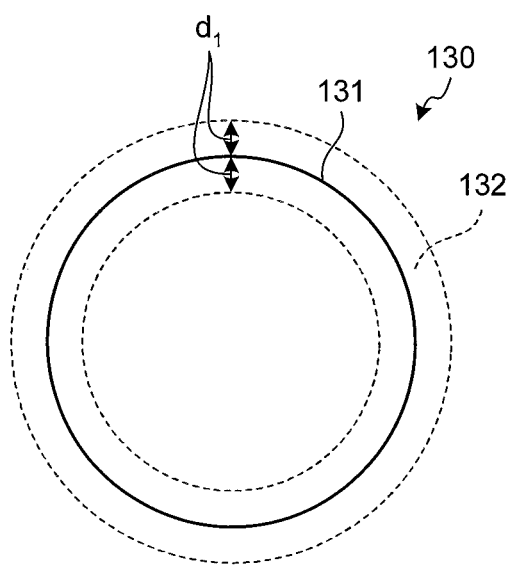
FIG. 13 is a view illustrating a method for setting a boundary region.

In step S19, the boundary region extraction unit 201 extracts a region within a range falling with a distance $d_1$ from a circumference 131 of a circular region 130, and sets this region as a boundary region 132, as shown in FIG. 13. Then, the boundary region extraction unit 201 counts the number N of pixels contained in the boundary region 132.

In step S20, the boundary-region information calculation unit 202 calculates an evaluation value used for determining whether the circular region 130 actually exists in the in-vivo image 120. Specifically, the boundary-region information calculation unit 202 calculates the average $S_{AVE}$ of the gradient magnitudes from the sum of the gradient magnitudes of pixels contained in the boundary region 132 and the number N of the pixels, and then calculates an evaluation value $E_1$ by using formula (7) shown below.

$$E_1 = S_{AVE} \times k \qquad (7)$$

In formula (7), k is a predetermined coefficient (constant).

In step S21, the determination unit 21 determines, on the basis of the evaluation value $E_1$, whether the circular region 130 actually exists in the in-vivo image 120. When the value of the evaluation value $E_1$ is more than a predetermined threshold, the circular region 130 is determined to actually exist in the in-vivo image 120.

When the circular region 130 has been determined to actually exist in the in-vivo image 120 (step S21: Yes), the circular-region detecting unit 17 outputs information (the central coordinates and the radius of the circle, and pixel values of pixels contained therein) on the circular region to be determined, and stores the information in the storage unit 14 as information that represents a bubble region (step S22).

In step S23, the circular-region detecting unit 17 determines whether the number of times any one of the initial candidate points has been extracted as the estimation-use candidate point has exceeded a predetermined threshold. When the number of times of the extraction has not exceeded the threshold (step S23: No), the operation moves on to step S17. In this case, in the second and later rounds of steps S17 and S18, an initial candidate point located inside a region that has already been determined to be circular is not to be extracted. On the other hand, when the number of times of the extraction has exceeded the threshold (step S23: Yes), the operation ends.

Further, when the circular region 130 has been determined not to actually exist in the in-vivo image 120 (step S21: No), the circular-region detecting unit 17 determines whether the number of times (number of times of consecutively detecting no circular region) a series of processes in steps S17 to S21 has consecutively resulted in detecting no circular region has exceeded a predetermined value (step S24). When the number of times of consecutively detecting no circular region has not exceeded the predetermined value (step S24: No), the operation moves on to step S23. On the other hand, when the number of times of consecutively detecting no circular region has exceeded the predetermined value (step S24: Yes), the operation ends.

As described above, according to the first embodiment, while a circular region is estimated on the basis of edge pixels extracted from an in-vivo image, whether the estimated circular region actually exists in the in-vivo image is determined on the basis of calculated information belonging to the boundary region of the circular region. This enables highly accurate detection of a bubble region.

Additionally, according to the first embodiment, edge pixels extracted from the in-vivo image on the basis of structural characteristics belonging to bubble regions are extracted, and a circular region is estimated by use of these edge pixels. This reduces the amount of arithmetic operations, thereby enabling efficient detection of a circular region.

Further, according to the first embodiment, the size of a circular region is estimated on the basis of the distance information, and a range used for arithmetic operations in calculating a circular region later is limited on the basis of this size. This makes it possible to reduce the amount of arithmetic operations (calculation cost), and prevent incorrect detection of a circular region.

Further, although the high-luminance and white region is extracted as the mirror reflection region in the above description, either of the high-luminance region and the white region may be extracted as the mirror reflection region.

Note that, although robust estimation is used to estimate a circular region in the above description, a method similar thereto may be used to estimate an oval region.

As an evaluation value used for evaluating the circular region 130, any one of various values other than the above described evaluation value $E_1$ may be used. Examples of the evaluation value are described below in Variations 1-1 to 1-6.

Variation 1-1

An evaluation value $E_2$ according to Variation 1-1 is given by formula (8) shown below by use of the number N of all the pixels contained in the boundary region 132 shown in FIG. 14, and the number $N_{EDG}$ of edge pixels out of these pixels.

$$E_2 = (N_{EDG}/N) \times k \qquad (8)$$

In formula (8), k is a predetermined coefficient (constant).

In this case, when the evaluation value $E_2$ exceeds a predetermined threshold, it is determined that the circular region 130 is a bubble region actually existing in the in-vivo image 120.

Variation 1-2

An evaluation value $E_3$ according to Variation 1-2 is given by formula (9) shown below by use of the number N of all the pixels contained in the boundary region 132, and the sum $Y_{SUM}$ of luminance values in the boundary region 132.

$$E_3 = (Y_{SUM}/(N \times Y_{MAX})) \times k \qquad (9)$$

In formula (9), $Y_{MAX}$ is the maximum of the luminance values in the boundary region.

In this case, when the evaluation value $E_3$ exceeds a predetermined threshold, it is determined that the circular region 130 is a bubble region actually existing in the in-vivo image 120.

Variation 1-3

Alternatively, an evaluation value $E_4$ may be calculated on the basis of RGB values in the boundary region. In this case, the RGB color ranges of a bubble region have been previously acquired and stored in the storage unit 14.

First, the R value, G value and B value of each pixel contained in the boundary region 132 are acquired, and the averages of the respective color components are calculated. The average R value, average G value, average B value thus obtained are compared with the RGB color ranges, and a color difference $\Delta E$ is calculated. The evaluation value $E_4$ is given by formula (10) shown below by use of this color difference $\Delta E$.

$$E_4 = (1/\Delta E) \times k \qquad (10)$$

In this case, when the evaluation value $E_4$ exceeds a predetermined threshold, it is determined that the circular region 130 is a bubble region actually existing in the in-vivo image 120.

Variation 1-4

A bubble region usually assumes a circular shape or an arc-like shape which is a part of a circular shape. It is therefore possible to determine, on the basis of shape information of the circular region 130 (i.e., whether the circular region 130 geometrically has a feature of an arc), whether the circular region 130 is a bubble region. In Variation 1-4, continuity across edge pixels contained in the boundary region is determined.

Figure 14:
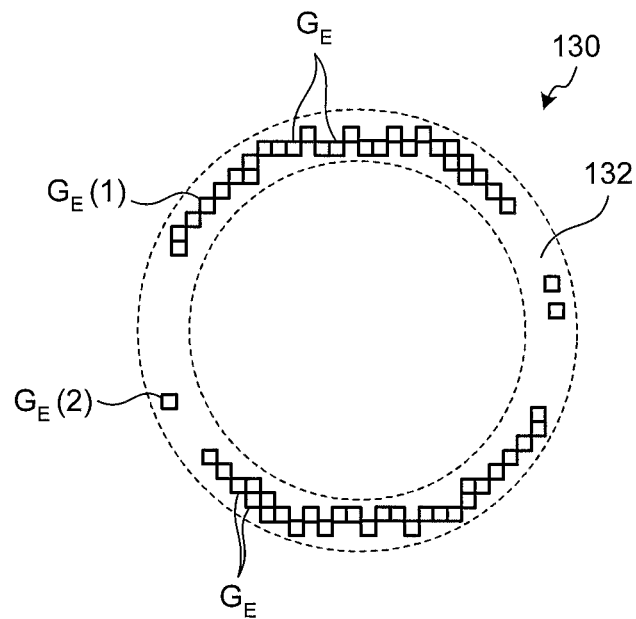
FIG. 14 is a view illustrating a method for calculating an evaluation value that represents continuity of edge pixels contained in the boundary region.

Specifically, as shown in FIG. 14, the number $N_{EDG1}$ (i.e., one equivalent to the area of the edges) of edge pixels $G_E$ contained in the boundary region 132 is acquired. Additionally, the number $N_{EDG2}$ of the edge pixels $G_E$ each of which has any edge pixel adjacent thereto that exits in any one of the eight directions around the corresponding edge pixel $G_E$ is counted. For example, the edge pixel $G_E$ (1) shown in FIG. 14 is counted because an edge pixel adjacent thereto exists along a direction obliquely upward and rightward from the edge pixel $G_E$ (1). On the other hand, the edge pixel $G_E$ (2) is not counted because an edge pixel adjacent thereto does not exist along any one of the eight directions around the edge pixel $G_E$ (2).

An evaluation value $E_5$ is given by formula (11) shown below by use of these values $N_{EDG1}$ and $N_{EDG2}$.

$$E_5 = (N_{EDG1} \times (1-k) + N_{EDG2} \times k)/N \quad (11)$$

Here, the number N of all the pixels contained in the boundary region 132 is used for normalizing the evaluation value by the size of the boundary region 132. Additionally, k is a coefficient (constant) that satisfies 0<k<1.

In this case, when the evaluation value $E_5$ exceeds a predetermined threshold, it is determined that the continuity across the edge pixels $G_E$ is high, and that the circular region 130 is therefore a bubble region actually existing in the in-vivo image 120.

Variation 1-5

An edge indicating the boundary of a bubble region usually appears at positions on the circumference of a circle that are opposite to each other about the central coordinates of the circle. Therefore, when the edge pixels $G_E$ contained in the boundary region 132 have high relativeness, it can be determined that these edge pixels $G_E$ constitute the boundary of the bubble region. Here, high relativeness means that there are a large number of pairs of edge pixels, the pairs each consisting of two edge pixels exist at positions opposite to each other about the central coordinates of a circle.

Figure 15:
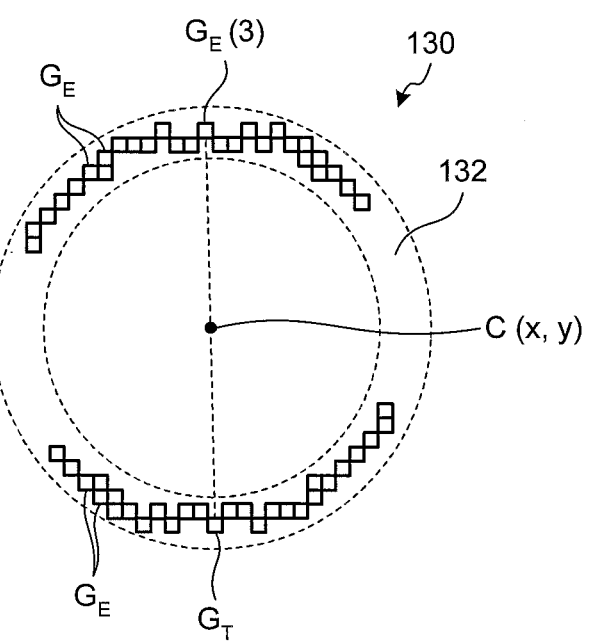
FIG. 15 is a view illustrating a method for calculating an evaluation value that represents relativeness, about the central coordinates of a circular region, among edge pixels contained in the boundary region.

Specifically, first, as shown in FIG. 15, the number $N_{EDG1}$ of the edge pixels $G_E$ extracted from the boundary region 132 is acquired. Additionally, in the boundary region 132, the number $N_{EDG3}$ of the edge pixels $G_E$ each of which is opposite to another edge pixel about the central coordinates C (x,y) of the circular region 130 is counted. For example, the edge pixel $G_E$ (3) shown in FIG. 15 is counted because another edge pixel $G_T$ exists on a diameter of the bubble candidate region 123, the diameter passing through the edge pixel $G_E$ (3). An evaluation value $E_6$ is given by formula (12) shown below by use of these values $N_{EDG1}$ and $N_{EDG3}$.

$$E_6 = (N_{EDG1} \times (1-k) + N_{EDG3} \times k)/N \quad (12)$$

In formula (12), k is a coefficient (constant) that satisfies 0<k<1.

In this case, when the evaluation value $E_6$ exceeds a predetermined threshold, it is determined that the relativeness among the edge pixels $G_E$ contained in the boundary region 132 is high, and that the circular region 130 is therefore a bubble region actually existing in the in-vivo image 120.

Variation 1-6

Figure 16:
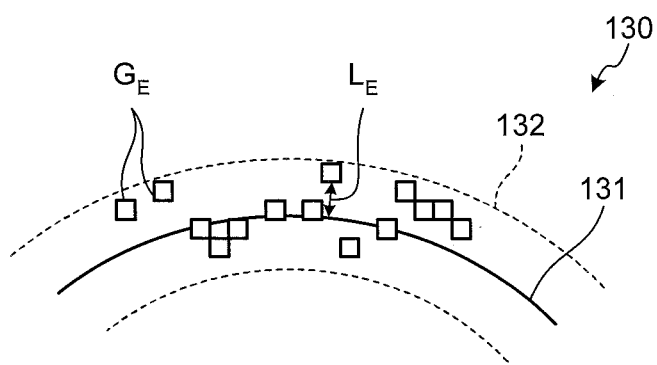
FIG. 16 is a view illustrating a method for calculating an evaluation value that represents circularity across edge pixels contained in the boundary region.

As feature data that represents shape information of the boundary region of the circular region 130, the circularity, i.e., the geometrical similarity to a circle, of edge pixels in the boundary region 132 may be used. FIG. 16 is a schematic view showing a part of the boundary region 132. In calculating the feature data, first, the number $N_{EDG1}$ of the edge pixels $G_E$ contained in the boundary region 132 is counted. Additionally, distances $L_E$ from the respective edge pixels $G_E$ to the circumference 131 of the circular region 130 are calculated, and the number $N_{GC}$ of the edge pixels $G_E$ that correspond to the distances $L_E$ that are not larger than a predetermined threshold is counted. An evaluation value $E_7$ is given by formula (13) shown below by use of these values $N_{EDG1}$ and $N_{GC}$.

$$E_7 = (N_{EDG1} \times (1-k) + N_{GC} \times k)/N \quad (13)$$

In formula (13), k is a coefficient (constant) that satisfies 0<k<1.

In this case, when the evaluation value $E_7$ exceeds a predetermined threshold, it is determined that the circularity among the edge pixels $G_E$ contained in the boundary region 132 is high, and that the circular region 130 is therefore a bubble region actually existing in the in-vivo image 120.

Second Embodiment

Figure 17:
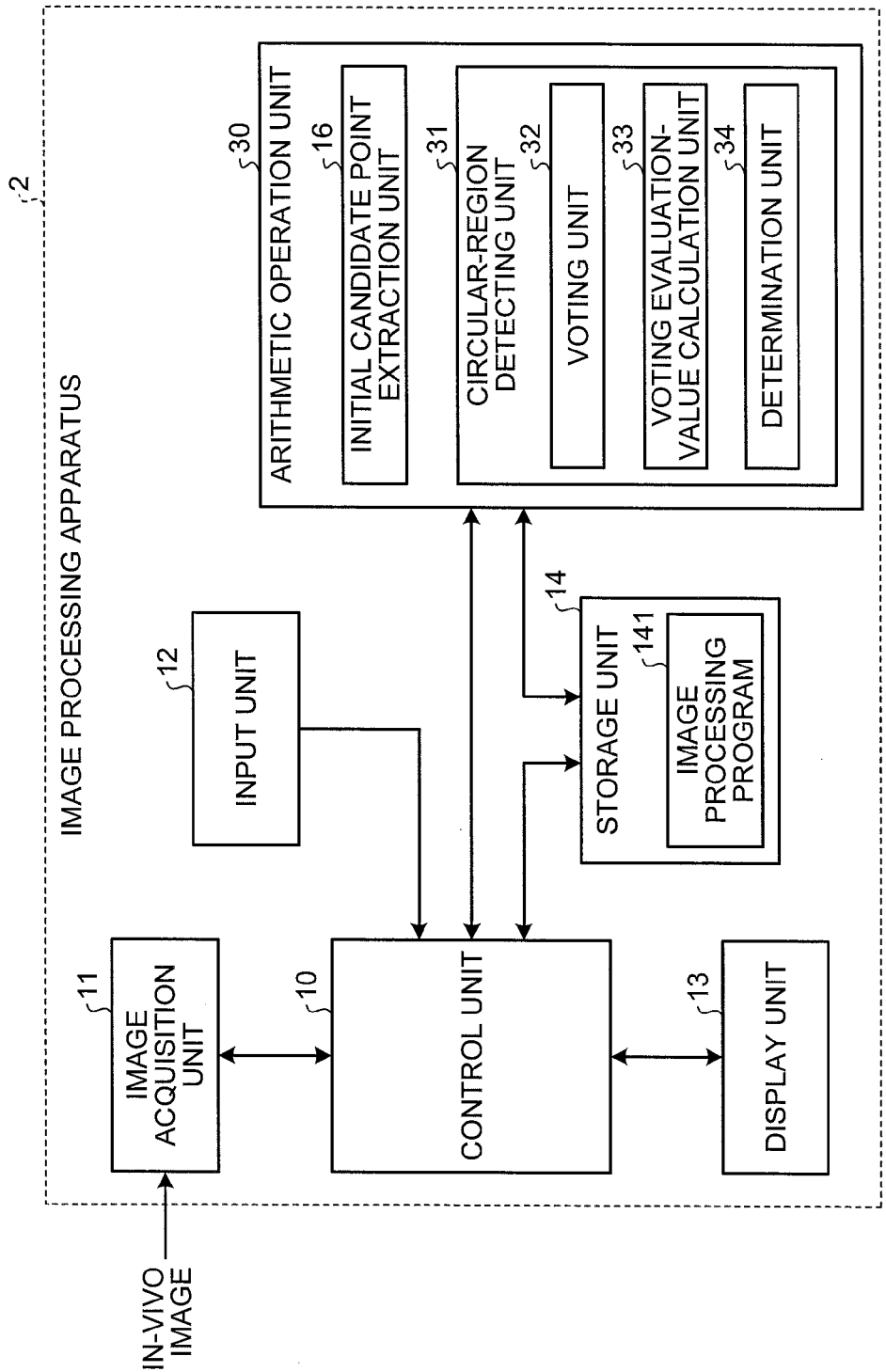
FIG. 17 is a block diagram showing the configuration of an image processing apparatus according to a second embodiment of the present invention.

A second embodiment of the present invention is described next. FIG. 17 is a block diagram showing the configuration of an image processing apparatus according to the second embodiment. As shown in FIG. 17, an image processing apparatus 2 comprises an arithmetic operation unit 30. The other parts of the configuration thereof are the same as those shown in FIG. 1.

The arithmetic operation unit 30 comprises the initial candidate point extraction unit 16 and a circular-region detecting unit 31. The configuration and operation of the initial candidate point extraction unit 16 are the same as those described in the first embodiment.

The circular-region detecting unit 31 detects a circular region by use of the Hough transform on the basis of the initial candidate points extracted by the initial candidate point extraction unit 16. More specifically, the circular-region detecting unit 31 comprises: a voting unit 32 which casts votes for the initial candidate points in a parameter space formed of the radiuses of circles and the central coordinates of the circles; a voting evaluation-value calculation unit 33 which calculates, on the basis of the numbers of votes casted in the parameter space, an evaluation value used for detecting a circular region; and a determination unit 34 which determines the circular region on the basis of the evaluation value.

Figure 18:
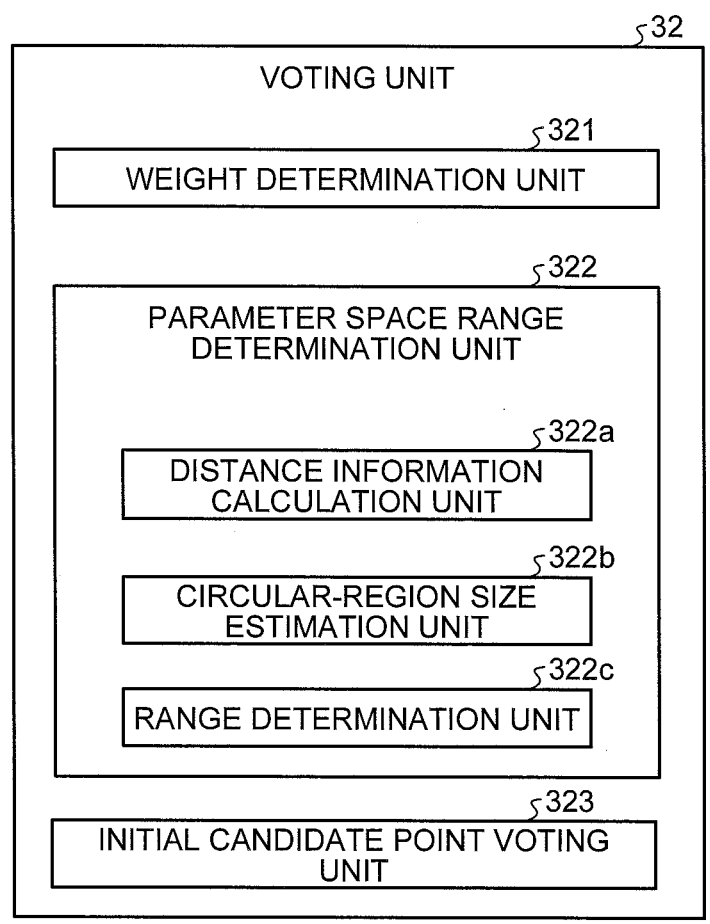
FIG. 18 is a block diagram showing the configuration of a voting unit shown in FIG. 17.

FIG. 18 is a block diagram showing the detailed configuration of the voting unit 32. The voting unit 32 comprises: a weight determination unit 321 which determines weights to be given to the initial candidate points for which votes are casted in the parameter space; a parameter space range determination unit 322 which determines the range of the parameter space; and an initial candidate point voting unit 323 which casts votes for the initial candidate points in the parameter space within the determined range.

The weight determination unit 321 determines the weights on the basis of information belonging to the respective initial candidate points in such a manner as to give larger weights to the initial candidate points that have features more similar to a bubble. For example, the weight determination unit 321 determines the weights corresponding to the gradient magnitudes of the respective initial candidate points.

The parameter space range determination unit 322 includes: a distance information calculation unit 322a which calculates distance information that represents depths of objects captured in the in-vivo image; a circular-region size estimation unit 322b which estimates, on the basis of the distance information, the size of a circular region to be detected; and a range determination unit 322c which determines the range of the parameter space on the basis of the size of the circular region.

Figure 19:
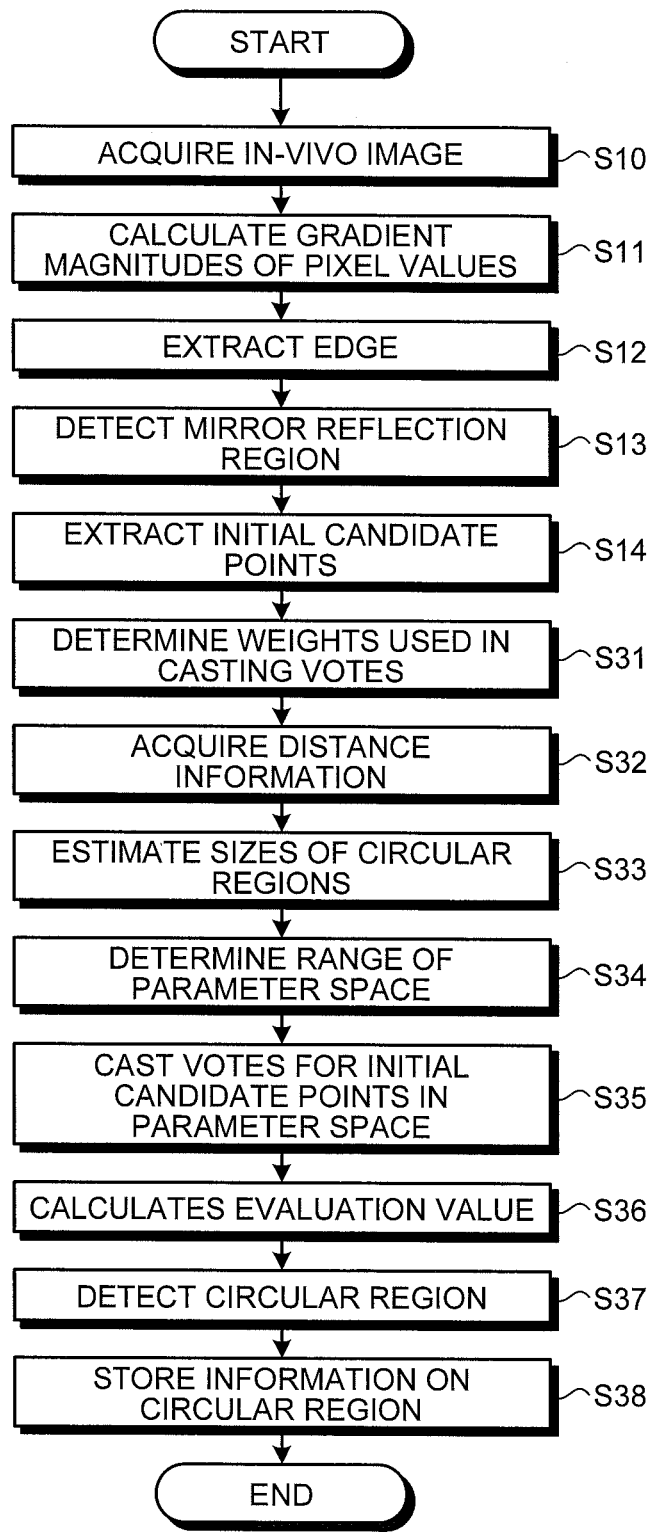
FIG. 19 is a flowchart showing operation of the image processing apparatus shown in FIG. 17.
Figure 20:
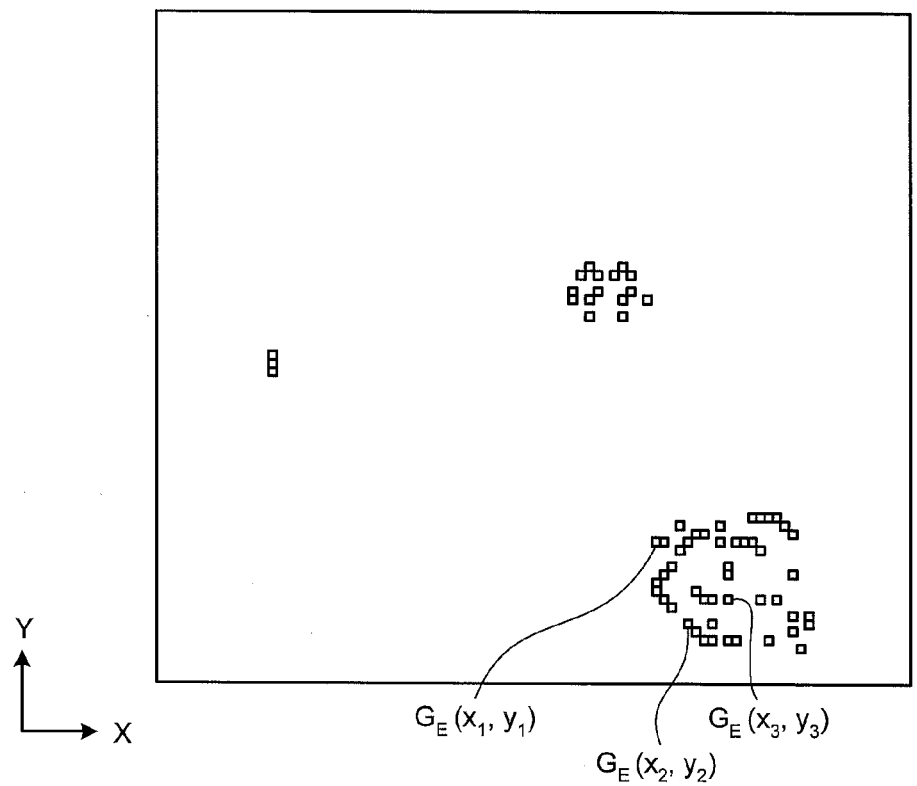
FIG. 20 is a view illustrating a method for casting votes for initial candidate points in a parameter space.

Next, operation of the image processing apparatus 2 is described. FIG. 19 is a flowchart showing the operation of the image processing apparatus 2. Steps S10 to S14 out of the steps shown in FIG. 19 are the same as those described in the first embodiment. Additionally, the initial candidate points $G_E(x_1,y_1)$, $G_E(x_2,y_2)$, $G_E(x_3,y_3)$ and so on, which have been extracted from the in-vivo image 120 (FIG. 6), are shown in an image shown in FIG. 20.

In step S31, using the gradient magnitude g of each of the initial candidate points and formula (14) shown below, the weight determination unit 321 calculates a weight $W_1$ to be given to the initial candidate point.

$$W_1 = (g/g_{MAX}) \times k \quad (14)$$

In formula (14), $g_{MAX}$ is the maximum of the gradient magnitudes of pixel values contained in an in-vivo image to be processed, and k is a predetermined coefficient (constant). The larger the gradient magnitude g is, the larger this weight $W_1$ is.

In step S32, the distance information calculation unit 322a acquires the distance information (depth information) in the in-vivo image. Note that a method for acquiring the distance information is the same as one described in step S15 in FIG. 5.

In step S33, the circular-region size estimation unit 322b estimates, on the basis of the distance information and a table 128 shown in FIG. 11, the sizes of circular regions at the pixel positions of the respective initial candidate points. Note that a method for estimating the size of a circular region is the same as one described in step S16 in FIG. 5.

In step S34, the range determination unit 322c determines the range of the parameter space.

Figure 21:
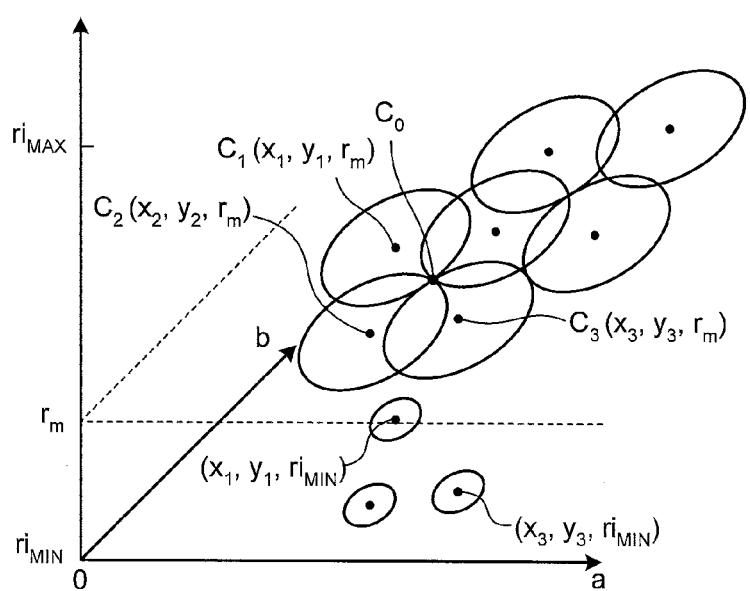
FIG. 21 is another view illustrating the method for casting votes for initial candidate points in a parameter space.

FIG. 21 is a schematic view showing a parameter space. In this three-dimensional parameter space, while the a-axis corresponds to the X-axis of an image 135, the b-axis corresponds to the Y-axis of the image 135. Additionally, the r-axis denotes the radius of a circular region. Therefore, the range of the a-axis, specifically, is from 0 at the minimum to the size of the in-vivo image in the X-axis direction at the maximum. Additionally, the range of the b-axis is from 0 at the minimum to the size of the in-vivo image in the Y-axis direction at the maximum. Further, the range of the r-axis is determined on the basis of the range of the sizes of circular regions (refer to FIG. 11) estimated for the respective regions A to D (refer to FIG. 10) in step S33. That is, while the minimum $ri_{MIN}$ of the minimum radiuses $r_{MIN}$ estimated for the respective regions A to D is set as the minimum of the r-axis, the maximum $ri_{MAX}$ of the maximum radiuses $r_{MAX}$ is set as the maximum of the r-axis.

In step S35, the initial candidate point voting unit 323 casts votes for the initial candidate points $G_E$ in a parameter space. Specifically, the initial candidate point voting unit 323 first generates the parameter space shown in FIG. 21. Subsequently, the initial candidate point voting unit 323 sequentially extracts the coordinates $G_E(x_n,y_n)$ of the initial candidate points from the image 135 along the scanning direction. Then, on a plane given by $r=r_m$ in the parameter space, the initial candidate point voting unit 323 casts votes for points while giving the weight $W_1$ to the points, the points being located on the circumference of a circle with the center at the coordinates $(x_n,y_n,r_m)$ and with a radius of $r_m$. The voting in this manner is performed with the value of r (a plane on which the votes are casted and the value of the radius) being changed, for example, by one pixel in the range from $ri_{MIN}$ to $ri_{MAX}$.

In step S36, the voting evaluation-value calculation unit 33 calculates, on the basis of the numbers of votes casted in the parameter space, an evaluation value used for detecting a circular region. Here, a point $C_0$ is a point at which circles with the centers at $C_1(x_1,y_1,r_m)$, $C_2(x_2,y_2,r_m)$ and $C_3(x_3,y_3,r_m)$ and with radiuses of $r_m$ intersect with one another. In other words, distances from these points $C_1$, $C_2$ and $C_3$ to the point $C_0$ are the same, whereby it is possible to estimate that a circular region with the center at the point $C_0$ and with a radius of $r_m$ exists in the image 135. That is, coordinates (a,b,r) for which the numbers of votes casted are high represent a circular region in the image 135.

As the evaluation value, for example, a processing result (the numbers of votes) obtained by removing noise from the respective $r_m$ planes in the parameter space by applying smoothing thereto with a Gaussian filter (CG-Arts Society, "Digital Image Processing", pp. 108-110) or the like is used.

In step S37, the determination unit 34 extracts any coordinates (a, b, r), in the parameter space, for which the evaluation value is not less than a predetermined threshold, and detects, a region (i.e., the central coordinates and the radius of a circular shape) in the image 135 as a circular region, the region corresponding to these coordinates.

Further, in step S38, the circular-region detecting unit 31 outputs information (such as the central coordinates and the radius of a circular shape, and the pixel values of pixels contained therein) on the detected circular region, and stores this information in the storage unit 14 as information representing a bubble region.

As described above, according to the second embodiment, votes for the coordinates of edge pixels extracted from an in-vivo image are casted in a parameter space, and a circular region is detected on the basis of the numbers of votes. This makes it possible both to reduce the amount of arithmetic operations, and to improve accuracy in detecting a circular region, which represents a bubble region.

Additionally, according to the second embodiment, weights given to the initial candidate points in the voting into a parameter space are set in such a manner that a larger one of the weights is given to the initial candidate point that has a feature more similar to the feature of a bubble. This makes it possible both to facilitate detection of a circular region that has the feature of a bubble, and to prevent incorrect detection.

Note that, although a circular region is detected by means of the Hough transform in the above description, an oval region can also be detected by means of the like method. In such a case, votes for initial candidate points may be casted in a four-dimensional parameter space corresponding to the central coordinates (a,b), the major axes and the minor axes of ovals.

Variation 2-1

The weights determined by the weight determination unit 321 may be determined by use of feature data other than the feature data in terms of the gradient magnitudes of initial candidate points. For example, the weights, $W_2$, may be determined by use of luminance values, which are calculated for the respective initial candidate points by use of formula (6), and formula (15) shown below.

$$W_2 = (Y/Y_{MAX}) \times k \quad (15)$$

In formula (15), $Y_{MAX}$ is the maximum of the luminance values of the initial candidate points. Note that k is a predetermined coefficient (constant).

Variation 2-2

Alternatively, the weights may be determined on the basis of color information of the initial candidate points. For example, the R values, G values and B values in the respective initial candidate points are acquired, and these values are compared with the RGB color ranges, whereby color differences ΔE are calculated. Subsequently, the weights, $W_3$, are calculated by use of formula (16) shown below. The smaller the color difference ΔE, the larger the value of this weight $W_3$.

$$W_3=(1/\Delta E)\times k \tag{16}$$

Note that the RGB color ranges of bubble regions have been previously stored in the storage unit 14. In addition, k is a predetermined coefficient (constant).

Third Embodiment

Figure 22:
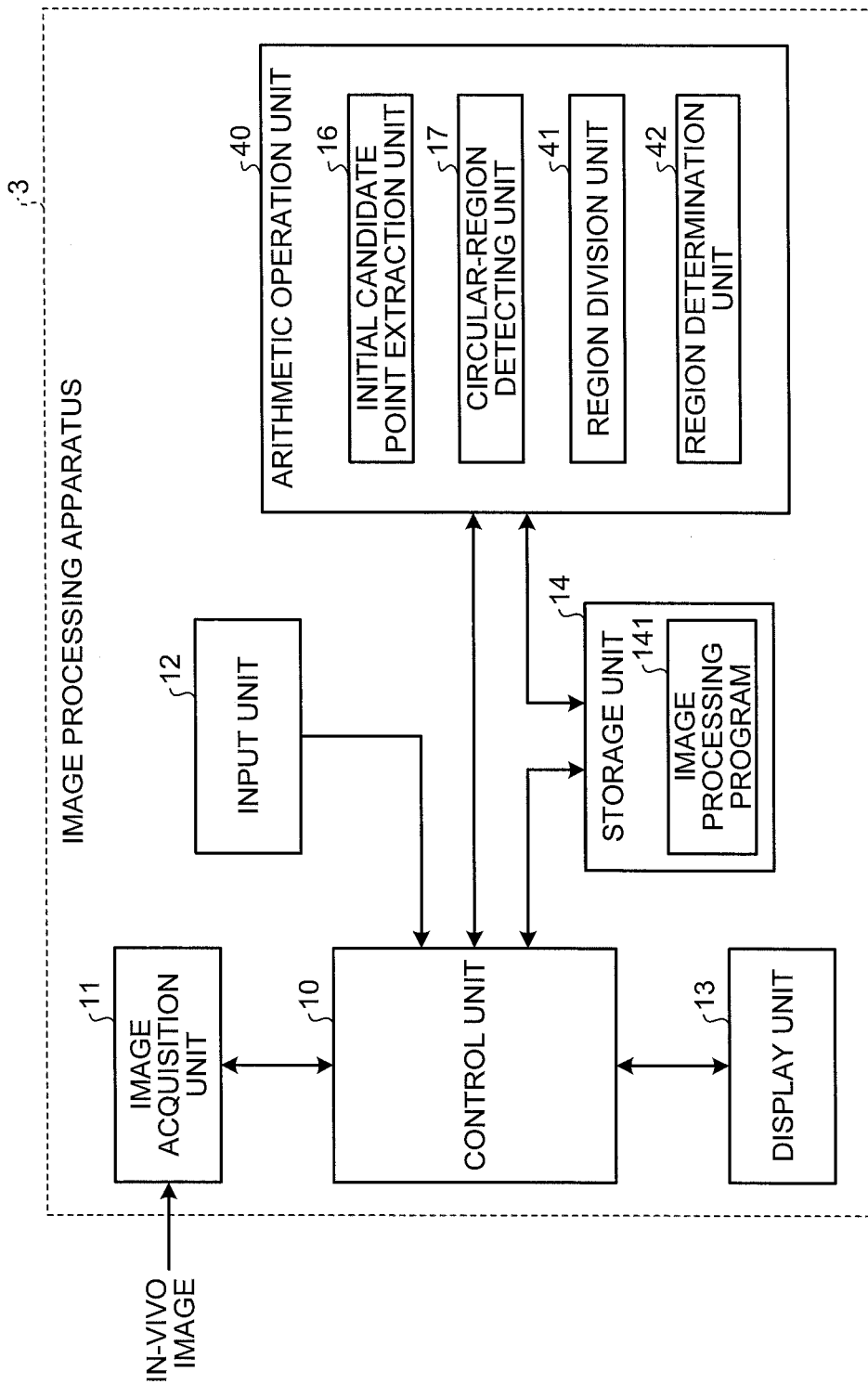
FIG. 22 is a block diagram showing the configuration of an image processing apparatus according to a third embodiment of the present invention.

A third embodiment of the present invention is described next. FIG. 22 is a block diagram showing the configuration of an image processing apparatus according to the third embodiment. As shown in FIG. 22, an image processing apparatus 3 comprises an arithmetic operation unit 40. The other parts of the configuration thereof are the same as those shown in FIG. 1.

In addition to the initial candidate point extraction unit 16 and the circular-region detecting unit 17, the arithmetic operation unit 40 further comprises: a region division unit 41 which divides an in-vivo image into plural regions; and a region determination unit 42 which determines whether bubble regions exist throughout the whole of each of the divisional regions. Note that the configurations and operation of the initial candidate point extraction unit 16 and the circular-region detecting unit 17 are the same as those described in the first embodiment.

Here, regions in an in-vivo image that have features (features in terms of color, texture or the like) similar to each other are often of the same category (such as, for example, a mucosal region or a bubble region). Consequently, in the third embodiment, an in-vivo image is divided into plural regions on the basis of feature data representing color information or the like. Then, when regions that have been individually determined to be bubble regions account for a predetermined portion or more of any one of the divisional regions, it is assumed that bubble regions exist throughout the whole of this one of the divisional regions. This makes it possible to detect even a bubble region that has not been able to be detected individually.

Figure 23:
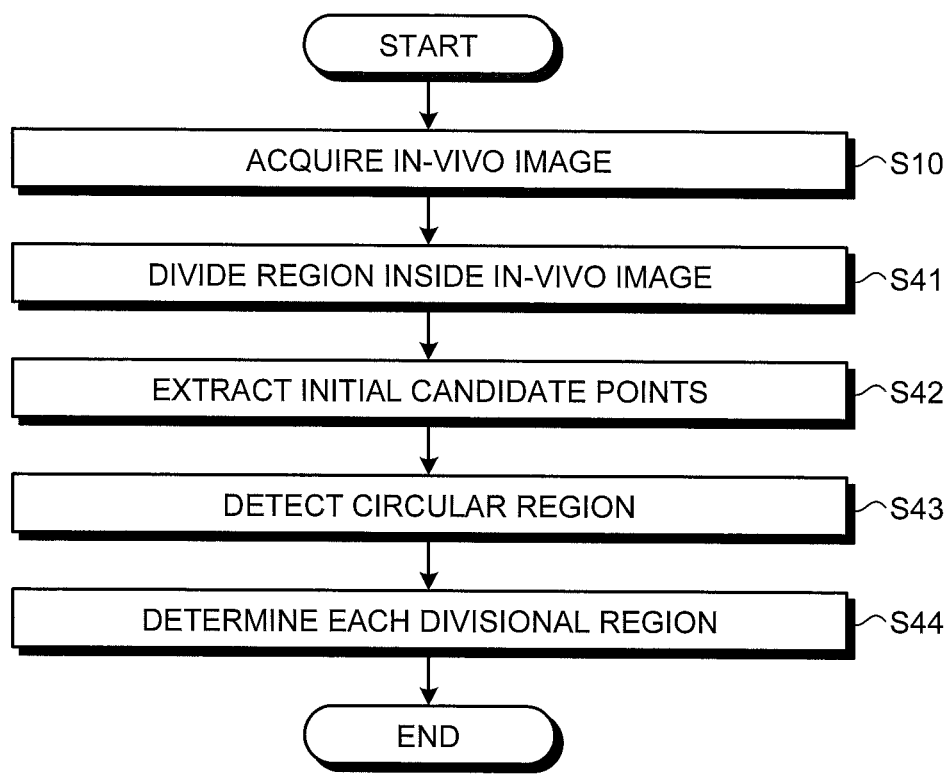
FIG. 23 is a flowchart showing operation of the image processing apparatus shown in FIG. 22.

FIG. 23 is a flowchart showing operation of the image processing apparatus 3.

First, in step S10, the image processing apparatus 3 acquires an in-vivo image. Note that details of this step are the same as those described in the first embodiment.

Figure 24:
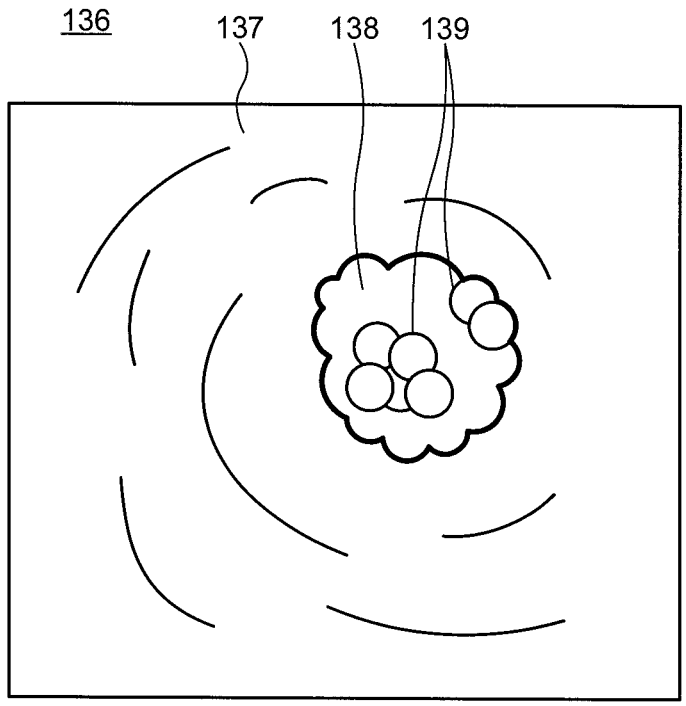
FIG. 24 is a view illustrating a method, used in the image processing apparatus shown in FIG. 22, for determining a bubble region.

In subsequent step S41, the region division unit 41 divides an in-vivo image 136 into plural regions 137 and 138 as shown in FIG. 24. As a method for the division, any one of a variety of known methods may be used. For example, a region unification method (reference: CG-ARTS Society, "Digital Image Processing", p. 196) or a K-means method (reference: CG-ARTS Society, "Digital Image Processing", p. 232) may be used, the region unification method being a method by which a region is divided into sets each consisting of pixels that have similar feature data (pixel values, texture feature data or the like) and are spatially close to one another and the K-means method being one of the clustering techniques.

In step S42, the initial candidate point extraction unit 16 extracts initial candidate points from the in-vivo image 136.

Note that a method for extracting the initial candidate points is the same as the one described in steps S11 to S14 in FIG. 5.

In step S43, the circular-region detecting unit 17 detects circular regions 139 on the basis of the extracted initial candidate points. Note that a method for detecting a circular region is the same as the one described in steps S15 to S23 in FIG. 5.

In step S44, the region determination unit 42 determines whether bubble regions exist in the whole of each of the divisional regions 137 and 138 on the basis of a result of the detection of circular regions. That is, first, the region determination unit 42 acquires the area (or the number of pixels) $s_1$ of each of the divisional regions, and the gross area (or the number of the pixels) $s_2$ of detected circular regions detected in each of the divisional regions, and calculates a ratio (area rate) $s_2/s_1$ of the area $s_2$ of the bubble regions to the area $s_1$ of each of the divisional regions. When this area rate $s_2/s_1$ is not less than a predetermined threshold, it is determined that bubble regions exist throughout the whole of the division region. On the other hand, when this area rate $s_2/s_1$ is less than the predetermined threshold, it is determined that bubble regions do not exist throughout the whole of the divisional region. For example, in the case of the divisional region 137, the ratio accounted for by the regions therein determined to be bubble regions is low (zero), whereby it is determined that bubble regions do not exist. On the other hand, in the case of the divisional region 138, the ratio accounted for by the circular regions 139 is high, whereby it is determined that bubble regions exist throughout the whole of the divisional region 138.

As described above, in the third embodiment, whether bubble regions exist throughout the whole of regions, which are obtained by the division based on similarity in feature data, is determined on the basis of a ratio accounted for by regions individually determined to be circular regions. Therefore, it is made possible to extract, as a bubble region, even a region that has not been detected as a circular region.

Note that, in the arithmetic operation unit 40, the circular-region detecting unit 31 described in the second embodiment may be used in place of the circular-region detecting unit 17. In this case, a circular region is detected in step S43 in the same manner as in steps S31 to S38 in FIG. 9.

Each of the image processing apparatuses according to Embodiments 1 to 3 described above can be implemented by executing, on a computer system such as a personal computer or a work station, an image processing program recorded in a recording medium. Additionally, such a computer system may be used while being connected to an apparatus such as another computer system or a server via a public line such as a local area network, a wide area network (LAN/WAN) or the Internet. In this case, each of the image processing apparatuses according to Embodiments 1 to 3 may be configured to acquire image data of intraluminal images via such networks, output image processing results to various output devices (such as a viewer and a printer) connected via such networks, and store image processing results in a storage device (such as a recording medium or a reader for the recording medium) connected via such networks.

According to one aspect of the present invention, candidate points forming parts of a circular region are extracted from an image, and a circular region is detected on the basis of information belonging to these candidate points, whereby accurate detection of regions each having a circular shape is made possible.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. an image processing apparatus comprising:
   a processor; and
   a memory storing computer-readable instructions that, when executed by the processor, implement:
   a candidate point extraction unit which extracts, from an image, candidate points which are candidates for points constituting a circular region that represents a bubble; and
   a circular-region detecting unit which detects a circular region in the image on the basis of information belonging to the candidate points;
   wherein the circular-region detecting unit comprises:
   an estimation-use candidate point extraction unit which extracts, from among candidate points extracted by the candidate point extraction unit, a plurality of estimation-use candidate points which are used for estimating a circular region;
   a circular-shape estimation unit which estimates a circular region on the basis of the plurality of estimation-use candidate points extracted by the estimation-use candidate point extraction unit;
   an evaluation value calculation unit which calculates an evaluation value used for determining whether the estimated circular region actually exists in the image; and
   a determination unit which determines whether the circular region actually exists in the image based on the evaluation value;
   wherein the candidate point extracting comprises:
   calculating gradient magnitudes of a plurality of pixels contained in the image.

2. The image processing apparatus according to claim 1, wherein the candidate point extraction unit extracts the candidate points on the basis of an internal structure belonging to a bubble region.

3. The image processing apparatus according to claim 2, wherein the candidate point extraction unit comprises:
   an edge detecting unit which detects an edge on the basis on the gradient magnitude.

4. The image processing apparatus according to claim 3, wherein the gradient magnitude calculation unit comprises a salient gradient magnitude calculation unit which calculates a gradient magnitude in a direction along which the gradient of a respective pixel is salient.

5. The image processing apparatus according to claim 2, wherein the candidate point extraction unit comprises a mirror-reflection region detecting unit which detects, from the image, a mirror reflection region where mirror reflection has occurred at the time of irradiation of a bubble with illuminating light.

6. The image processing apparatus according to claim 5, wherein the mirror-reflection region detecting unit includes a high-luminance region detecting unit which detects, from the image, a high-luminance region which has a luminance level not less than a predetermined value.

7. The image processing apparatus according to claim 5, wherein the mirror-reflection region detecting unit includes a white-region detecting unit which detects, from the image, a pixel that has a pixel value included in a color range representing the white color.

8. The image processing apparatus according to claim 1, further comprising a storage unit which stores therein information on a circular region which has been determined by the determination unit to actually exit in the image, wherein the estimation-use candidate point extraction unit extracts the plurality of estimation-use candidate points from a region outside a circular region stored in the storage unit.

9. The image processing apparatus according to claim 1, wherein the estimation-use candidate point extraction unit includes a circular-region size estimation unit which estimates the size of the circular region.

10. The image processing apparatus according to claim 9, wherein the circular-region size estimation unit calculates distance information on the basis of the pixel values of pixels contained in the image, and estimates the size of the circular region on the basis of the distance information, the distance information representing the depths of objects captured in the image.

11. The image processing apparatus according to claim 8, wherein the evaluation value calculation unit comprises:
    a boundary-region extraction unit which extracts a boundary region contained in the periphery of the estimated circular region; and
    a boundary-region information calculation unit which acquires information on pixels contained in the boundary region.

12. The image processing apparatus according to claim 11, wherein the boundary-region information calculation unit calculates the average of the gradient magnitudes of pixel values in pixels contained in the boundary region.

13. The image processing apparatus according to claim 11, wherein the boundary-region information calculation unit counts the number of edge pixels contained in the boundary region.

14. The image processing apparatus according to claim 11, wherein the boundary-region information calculation unit calculates the average of the luminance values of the pixel values of pixels contained in the boundary region.

15. The image processing apparatus according to claim 11, wherein the boundary-region information calculation unit acquires color information of pixels contained in the boundary region.

16. The image processing apparatus according to claim 11, wherein the boundary-region information calculation unit calculates information that represents a shape of edge pixels contained in the boundary region.

17. The image processing apparatus according to claim 16, wherein the boundary-region information calculation unit calculates an evaluation value that represents continuity across the edge pixels.

18. The image processing apparatus according to claim 17, wherein the boundary-region information calculation unit counts the number of edge pixels each of which has an edge pixel adjacent thereto that exists in the boundary region.

19. The image processing apparatus according to claim 16, wherein the boundary-region information calculation unit calculates an evaluation value that represents relativeness about the central coordinates of the circular region among edge pixels contained in the boundary region.

20. The image processing apparatus according to claim 19, wherein the boundary-region information calculation unit counts, in the boundary region, the number of edge pixels that have other edge pixels at positions opposite thereto about the central coordinates of the circular region.

21. The image processing apparatus according to claim 16, wherein the boundary-region information calculation unit calculates an evaluation value that represents the circularity of edge pixels contained in the boundary region.

22. The image processing apparatus according to claim 21, wherein the boundary-region information calculation unit calculates a distance between the circumference of the circular region and each edge pixel contained in the boundary region.

23. The image processing apparatus according to claim 1, further comprising:
- a region division unit which divides the image into a plurality of regions; and
- a region determination unit which determines whether bubble regions exist throughout the whole of each of the divisional regions thus obtained.

24. The image processing apparatus according to claim 1, wherein the image is an in-vivo image obtained by imaging the interior of a lumen in a living organism.

25. an image processing method comprising:
- candidate point extracting from an image, candidate points which are candidates for points constituting a circular region that represents a bubble;
- and circular-region detecting a circular region in the image on the basis of information belonging to the candidate points;
- wherein the circular-region detecting comprises:
- extracting, from among candidate points extracted by the candidate point extracting, a plurality of estimation-use candidate points which are used for estimating a circular region;
- estimating a circular region on the basis of the extracted plurality of estimation-use candidate points;
- calculating an evaluation value used for determining whether the estimated circular region actually exists in the image;
- and determining whether the circular region actually exists in the image based on the evaluation value;
- wherein the candidate point extracting comprises:
  - calculating gradient magnitudes of a plurality of pixels contained in the image.

26. A non-transitory computer-readable recording device with an executable program stored thereon, wherein the program instructs a processor to perform:
- candidate point extracting from an image, candidate points which are candidates for points constituting a circular region that represents a bubble;
- and circular-region detecting a circular region in the image on the basis of information belonging to the candidate points;
- wherein the circular-region detecting comprises:
- extracting, from among candidate points extracted by the candidate point extracting, a plurality of estimation-use candidate points which are used for estimating a circular region;
- estimating a circular region on the basis of the extracted plurality of estimation-use candidate points;
- calculating an evaluation value used for determining whether the estimated circular region actually exists in the image; and determining whether the circular region actually exists in the image based on the evaluation value;
- wherein the candidate point extracting comprises:
  - calculating gradient magnitudes of a plurality of pixels contained in the image.

27. An image processing apparatus comprising:
- a candidate point extraction unit which extracts, from an image, candidate points which are candidates for points constituting a circular region that represents a bubble;
- and a circular-region detecting unit which detects a circular region in the image on the basis of information belonging to the candidate points;
- wherein the circular-region detecting unit comprises:
- an estimation-use candidate point extraction unit which extracts, from among candidate points extracted by the candidate point extraction unit, a plurality of estimation-use candidate points which are used for estimating a circular region;
- a circular-shape estimation unit which estimates a circular region on the basis of the plurality of estimation-use candidate points extracted by the estimation-use candidate point extraction unit;
- an evaluation value calculation unit which calculates an evaluation value used for determining whether the estimated circular region actually exists in the image;
- and a determination unit which determines whether the circular region actually exists in the image based on the evaluation value;
- wherein the candidate point extracting comprises:
  - calculating gradient magnitudes of a plurality of pixels contained in the image.

* * * * *